United States Patent [19]
Kimura et al.

[11] Patent Number: 5,783,656
[45] Date of Patent: Jul. 21, 1998

[54] POLYAMIC ACID, POLYIMIDE AND LIQUID CRYSTAL ALIGNING AGENT

[75] Inventors: Masayuki Kimura; Tsukasa Toyoshima; Keiichi Yamamoto; Kengo Wakabayashi; Yasuo Matsuki, all of Yokkaichi; Kyouyu Yasuda, Tsu, all of Japan

[73] Assignee: Japan Synthetic Rubber Co., Ltd., Tokyo, Japan

[21] Appl. No.: 791,616

[22] Filed: Jan. 31, 1997

[30] Foreign Application Priority Data

Feb. 6, 1996 [JP] Japan ................. 8-019562

[51] Int. Cl.$^6$ .................. C08G 73/10; C08G 73/12; C08G 69/26
[52] U.S. Cl. .............. 528/353; 528/170; 528/172; 528/173; 528/176; 528/183; 528/188; 528/220; 528/229; 528/310; 528/322; 528/332; 528/335; 528/350; 428/1; 428/473.5
[58] Field of Search .................. 528/350, 310, 528/322, 335, 332, 353, 170, 172–173, 176, 183, 188, 220, 229; 428/1, 473.5

[56] References Cited

U.S. PATENT DOCUMENTS

| | | | |
|---|---|---|---|
| 5,276,132 | 1/1994 | Nishikawa et al. | 528/353 |
| 5,298,590 | 3/1994 | Isogai et al. | 528/188 |

FOREIGN PATENT DOCUMENTS

| | | |
|---|---|---|
| 2-223917 | 9/1990 | Japan . |
| 2-223918 | 9/1990 | Japan . |
| 2-223919 | 9/1990 | Japan . |
| 4-7333 | 1/1992 | Japan . |
| 4-294327 | 10/1992 | Japan . |
| 5-43687 | 2/1993 | Japan . |
| 6-136122 | 5/1994 | Japan . |
| 8-12759 | 1/1996 | Japan . |

OTHER PUBLICATIONS

Patent Abstracts of Japan, vol. 17, No. 631, (P–1648), 22 Nov. 1993 & JP 05 203952 (Japan Synthetic Rubber Co., Ltd.), 13 Aug. 1993.
Patent Abstracts of Japan, vol. 18, No. 40, (C–1155), 21 Jan. 1994 & JP 05 263077 (Japan Synthetic Rubber Co., Ltd.), 12 Oct. 1993.
Patent Abstracts of Japan, vol. 16, No. 152, (C–0929), 15 Apr. 1992 & JP 04 007333 (Japan Carlit Co. Ltd.), 10 Jan. 1994.

*Primary Examiner*—P. Hampton-Hightower
*Attorney, Agent, or Firm*—Oblon, Spivak, McClelland, Maier & Neustadt, P.C.

[57] ABSTRACT

There are provided a polyamic acid obtainable by reacting a diamine compound of the formula (1)

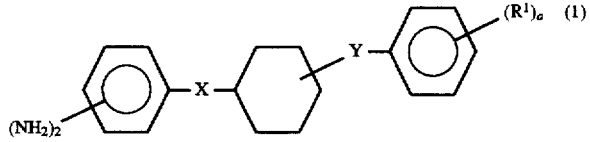

wherein $R^1$ is an alkyl group having 1 to 12 carbon atoms, a haloalkyl group having 1 to 12 carbon atoms or a halogen atom, each of X and Y is independently a divalent linking group,
with a tetracarboxylic acid dianhydride; a polyimide obtainable by dehydrating and ring-closing the above polyamic acid; and a liquid crystal aligning agent containing the above polyamic acid and/or the above polyimide.

7 Claims, 14 Drawing Sheets

POLYAMIC ACID, POLYIMIDE AND LIQUID CRYSTAL ALIGNING AGENT

DETAILED DESCRIPTION OF THE INVENTION

The present invention relates to a novel polyamic acid, polyimide and liquid crystal aligning agent containing at least one of these two.

There is already known a liquid crystal display device (TN liquid crystal display device) having a TN (twisted nematic) liquid crystal cell, in which a nematic liquid crystal having a positive dielectric anisotropy is sandwiched between substrates having a liquid crystal aligning film of a polyimide and a transparent electrode, and the major axes of liquid crystal molecules are continuously twisted 90 degrees between the substrates. In the above TN liquid crystal display device, the liquid crystal alignment is formed by a rubbing-treated liquid crystal aligned film.

Recently, further, there have been developed an STN (super twisted nematic) liquid crystal display device excellent in contrast and viewing angle dependency and an SH (super homeotropic) liquid crystal display device. The STN liquid crystal display device uses, as a liquid crystal, a blend of a nematic liquid crystal with a chiral agent which is an optically active substance, and it utilizes a birefringence effect caused by continuously twisting the major axes of the liquid crystal at least 180 degrees between substrates. In the SH liquid crystal display device, a liquid crystal of which the molecules have a negative dielectric anisotropy are perpendicularly aligned, and the device is operated by simple matrix driving in which the molecules are tilted by applying a voltage.

When a conventionally known liquid crystal aligning film of a polyimde, or the like, is used to fabricate the STN liquid crystal display, however, the pre-tilt angle of the liquid crystal aligning film is small so that the liquid crystal cannot be twisted at least 180 degrees between substrates, and it is therefore difficult to achieve desired display functions. In the STN liquid crystal display device, it is required to use a liquid crystal aligning film formed by diagonally depositing silicon dioxide, for aligning the liquid crystal. However, the problem is that the aligning film is not suitable for mass production since its production process is complicated. In the SH liquid crystal display device, a substrate formed by diagonally depositing silicon dioxide is used, or it is required to treat a substrate with a fluorine-containing surfactant or a coupling agent having a long-chain alkyl group, for perpendicularly aligning the liquid crystal. However, the problem is that the use of the surfactant or the coupling agent decreases reliability.

In the TN liquid crystal display device, further, a liquid crystal aligning film having a high pre-tilt angle is increasingly desired for preventing a display failure caused by a reverse-tilt phenomenon at a time of driving the liquid crystal cell.

It is conventionally general practice to introduce a long-chain alkyl group into the terminal and the side chain portion(s) of a polyimide, for developing a high pre-tilt angle. However, the problem is that an aligning film of the polyimide modified with the long-chain alkyl group shows insufficient process margin in pre-tilt angle. For this reason, in the STN liquid crystal display device in particular, the variability in pre-tilt angle caused by non-uniformity of film thickness and rubbing non-uniformity appears, due to its principles, as non-uniformity in display, and there is therefore required a material having a broad process margin in pre-tilt angle development.

It is a first object of the present invention to provide a novel polyamic acid useful as a liquid crystal aligning agent.

It is a second object of the present invention to provide a novel polyimide useful as a liquid crystal aligning agent.

It is a third object of the present invention to provide a liquid crystal aligning agent which provides an excellent alignment of a liquid crystal, has a large pre-tilt angle and decreases the dependency of the pre-tilt angle upon production process conditions of a liquid crystal display device such as film thickness and rubbing conditions, when formed as a liquid crystal aligning film.

Other objects and advantages of the present invention will be apparent from the following description.

The above objects and advantages of the present invention are achieved, first, by a polyamic acid (to be referred to as "specific polymer I" hereinafter), which is obtainable by reacting a diamine compound (to be referred to as "specific diamine compound" hereinafter) of the formula (1),

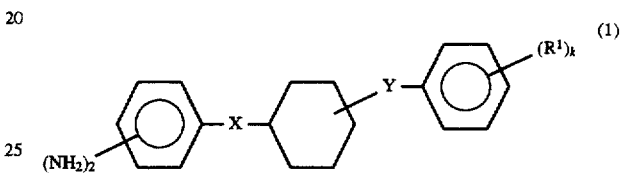

wherein $R^1$ is an alkyl group having 1 to 12 carbon atoms, a haloalkyl group having 1 to 12 carbon atoms or a halogen atom, each of X and Y is independently a divalent linking group of one of the following formulae (a) to (d),

and K is an integer of 0 to 5, with a tetracarboxylic acid dianhydride.

According to the present invention, further, there is provided, secondly, a polyimide (to be referred to as "specific polymer II" hereinafter), which is obtainable by dehydratively ring-closing the above polyamic acid of the present invention.

Further, according to the present invention, there is provided, thirdly, a liquid crystal aligning agent containing the above polyamic acid and/or the polyimide of the present invention.

Figure 1:
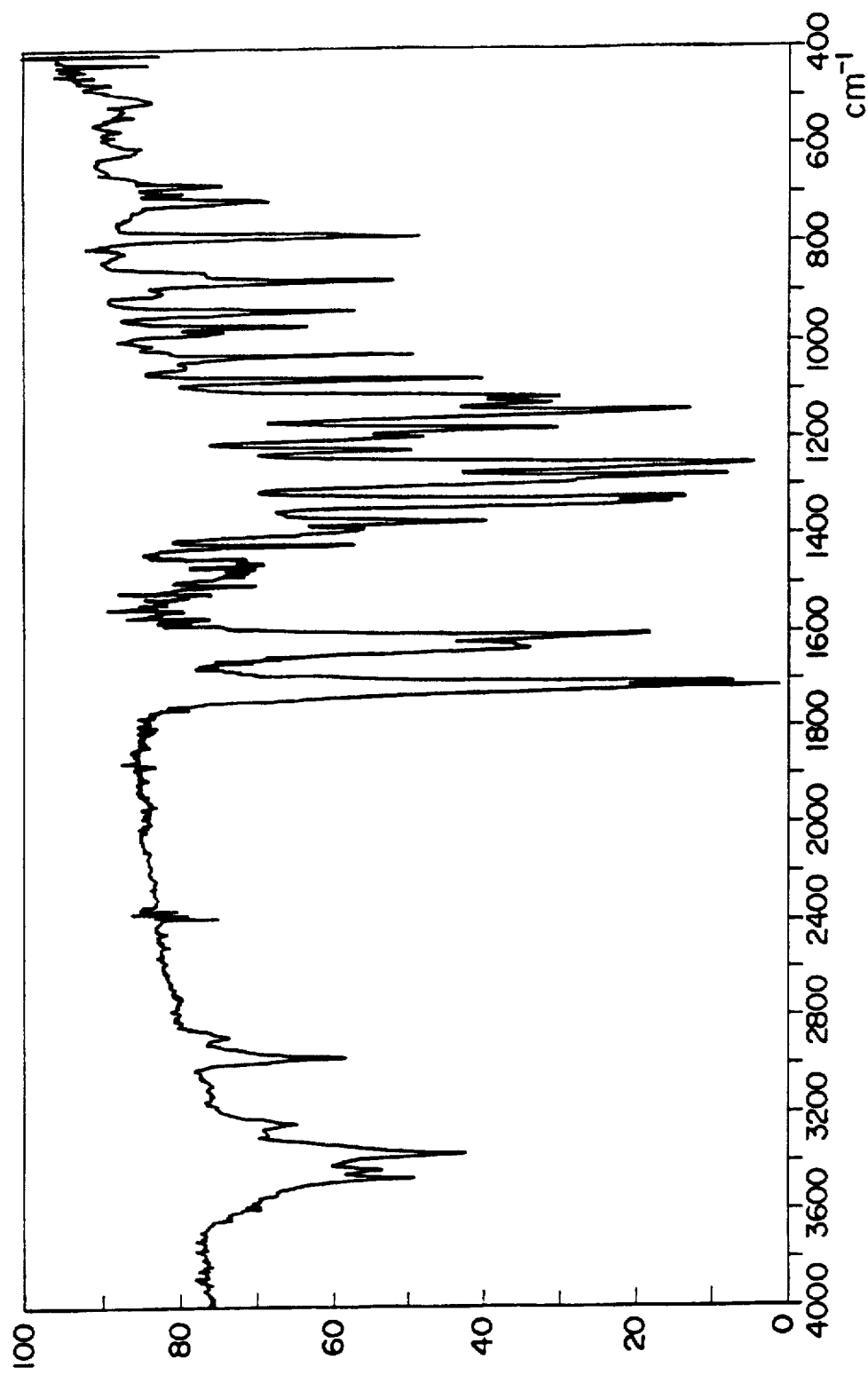
FIG. 1 is an infrared absorption spectrum of a specific example of the diamine compound used in the present invention.

The present invention will be explained in detail hereinafter.

Specific Diamine Compound

The specific diamine compound used in the present invention is a novel substance having the above formula (1).

In the formula (1), $R^1$ is an alkyl group having 1 to 12 carbon atoms, a haloalkyl group having 1 to 12 carbon atoms or a halogen atom, each of X and Y is independently an ester or amide group of one of the above formulae (a) to (d), and k is an integer of 0 to 5.

The alkyl group having 1 to 12 carbon atoms, included in the definition of $R^1$, is preferably a lower alkyl group having 1 to 4 carbon atoms. Examples of the alkyl group include methyl, ethyl, n-propyl, iso-propyl, n-butyl and tert-butyl.

The haloalkyl group having 1 to 12 carbon atoms, included in the definition of $R^1$, is preferably trifluoromethyl.

The halogen atom, included in the definition of $R^1$, is preferably a fluorine atom.

The divalent linking group included in the definition of each of X and Y has one of the above formulae (a) to (d). X and Y may be different, while X and Y are preferably the same in view of a production process.

"k" is an integer of 0 to 5. When a is an integer of 2 to 5, a plurality of substituents represented by $R^1$ may be the same or different.

The specific diamine compound of the above formula (1) can be obtained, for example, by the following method.

[When X is the group of the formula (a) and Y is the group of the formula (b)]

Step (i)

A dinitrobenzoic acid halide compound of the formula (2).

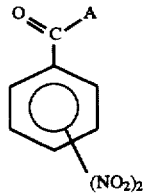

wherein A is a halogen atom, is reacted with dihydroxycyclohexane, to form a hydroxyl-group-containing compound of the formula (3).

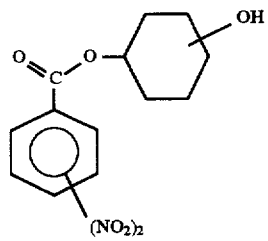

Step (ii)

The hydroxyl-group-containing compound formed in the step (i) is reacted with a compound of the formula (4).

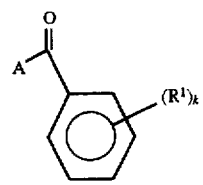

wherein $R^1$, A and k are as defined above, to obtain a dinitro compound of the formula (5).

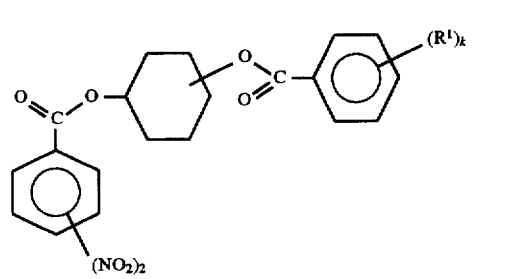

wherein $R^1$ and k are as defined above.

Step (iii)

The dinitro compound obtained in the step (ii) is reduced to obtain a specific diamine compound of the formula (6).

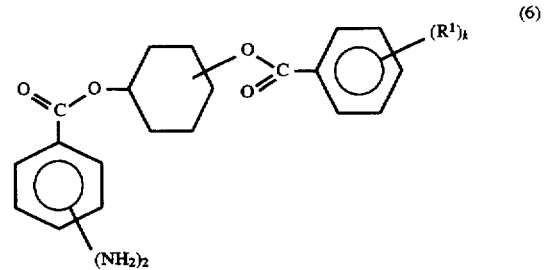

wherein $R^1$ and k are as defined above.

[When X is the group of the above formula (c) and Y is the group of the above formula (d)]

Step (i)

The dinitrobenzoic acid halide of the above formula (2) is reacted with diaminocyclohexane to form an amino-group-containing compound of the formula (7).

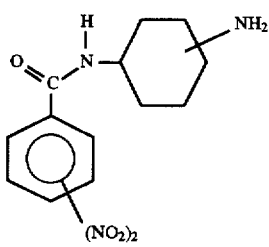
(7)

Step (ii)

The amino-group-containing compound formed in the step (i) is reacted with the compound of the above formula (4), to form a dinitro compound of the formula (8).

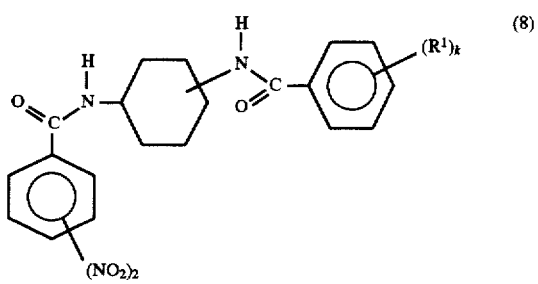
(8)

wherein $R^1$ and a are as defined above.
Step (iii)

The dinitro compound obtained in the step (ii) is reduced to obtain a specific diamine compound of the formula (9).

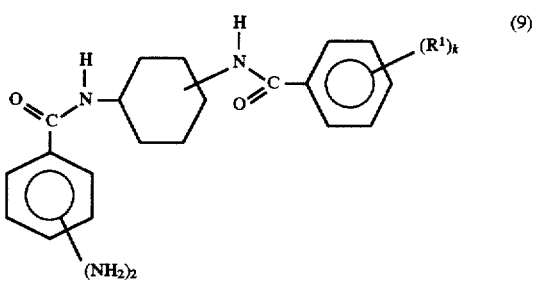
(9)

The above reactions for synthesizing the specific diamine compound may be carried out in a solvent as required. The solvent is not specially limited so long as it can dissolve the specific diamine compound and does not hamper the reaction. The solvent includes aromatic hydrocarbons such as benzene and toluene; ethers such as diethyl ether, tetrahydrofuran and dioxane; ketones such as acetone, methyl ethyl ketone and methyl isobutyl ketone; and other solvents such as dimethyl sulfoxide, dimethylformamide and dimethylacetamide.

The above reactions for synthesizing the specific diamine compound are carried out in the presence of a basic catalyst, and the basic catalyst is selected from sodium hydroxide, potassium hydroxide, pyridine or triethylamine.

The proportion of the amounts of the dinitrobenzoic acid halide of the above formula (2) and a compound having a cyclohexane structure such as dihydroxycyclohexane or diaminocyclohexane in each of the above steps (i) are preferably as follows. The amount of the compound having a cyclohexane structure per mole of the dinitrobenzoic acid halide is 2 to 20 mol.

In each of the above steps (ii), the amount of the compound of the above formula (4) or (8) per mole of the compound formed in the corresponding step (i) is preferably 1 to 1.2 mol.

In each of the above steps (iii), each dinitro compound may be reduced with a reducing agent such as hydrogen gas, hydrazine or hydrochloric acid in the presence of a known catalyst.

The above catalyst refers, for example, to a metal catalyst containing, as an active component, a group VIII metal such as iron, cobalt, nickel, ruthenium, rhodium, palladium, osmium, indium or platinum. Specifically, the catalyst includes a catalyst prepared by allowing a carrier to support the above metal and a complex catalyst of the above metal. Each of the above reducing reactions may be carried out in any one of homogeneous and heterogeneous reaction systems.

The amount of the above catalyst may be set appropriately. When the catalyst contains the above group VIII metal as an active component, the amount of the catalyst per 100 parts by weight of the dinitro compound is 0.0001 to 100 parts by weight, particularly preferably 0.001 to 20 parts by weight.

The above reducing reaction may be carried out by a method using a reducing agent such as zinc, tin (II) carbide, sodium hydrosulfide, sodium dithionite or ammonium sulfide. In this case, the amount of the reducing agent per mole of nitro groups of the dinitro compound is preferably 0.001 to 10 mol.

The solvent for use in the above reducing reaction is preferably selected from those which well dissolve both the dinitro compound and the diamine compound and do not alter in its properties during the reducing reaction. The solvent includes alcohols such as methanol, ethanol, propanol and butanol; and ethers such as diethyl ether, 1,2-dimethoxyethane, tetrahydrofuran, dioxane and anisole.

The specific diamine compounds of the formulae (6) and (9) may be used alone or in combination. The specific diamine compound used in the present invention preferably includes compounds of the following formula (10) to (17).

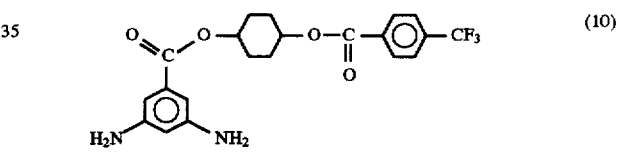
(10)

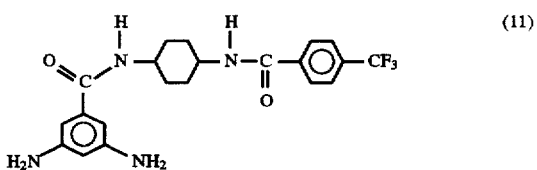
(11)

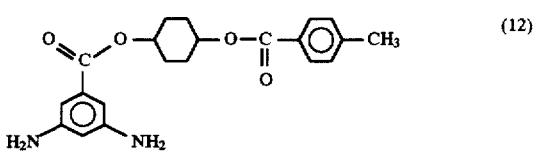
(12)

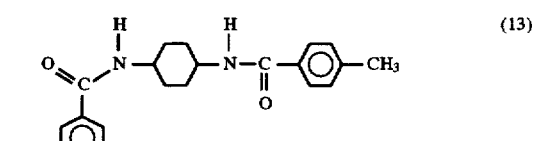
(13)

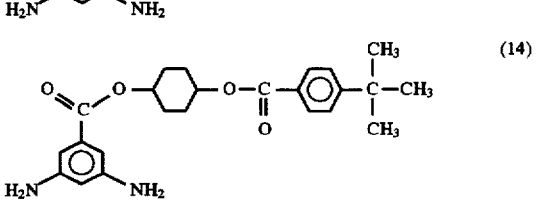
(14)

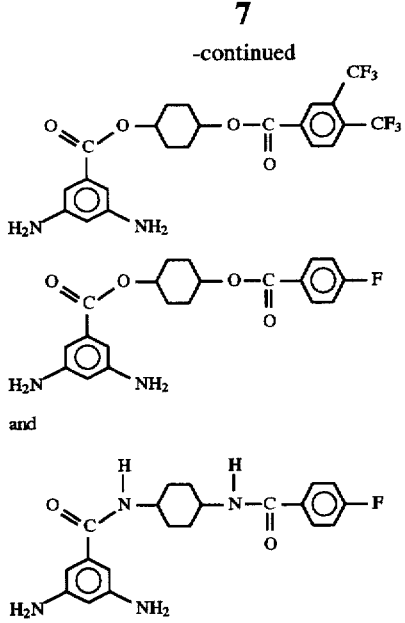

In the present invention, further, other diamine compound may be used in combination with the specific diamine compound so long as the other diamine compound does not hamper the effect of the present invention.

Other diamine compound

The other diamine compound includes the following compounds.

Aromatic diamine compounds such as p-phenylenediamine, m-phenylenediamine, 4,4'-diaminodiphenylmethane, 4,4'-diaminodiphenylethane, 4,4'-diaminodiphenyl sulfide, 4,4'-diaminodiphenylsulfone, 3,3'-dimethyl-4,4'-diaminobiphenyl, 4,4'-diaminobenzanilide, 4,4'-diaminodiphenyl ether, bis(4-aminophenyl)-1,4-diisopropylbenzene, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 3,4'-diaminodiphenyl ether, 3,3'-diaminobenzophenone, 3,4'-diaminobenzophenone, 4,4'-diaminobenzophenone, 2,2-bis[4-(4-aminophenyloxy)phenyl]propane, 2,2-bis[4-(4-aminophenyloxy)phenyl]hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy- 4,4'-diaminobiphenyl, 1,4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-diamino-2,2'-bis(trifluoromethyl)biphenyl and 4,4'-bis[(4-amino-2-trifluoromethyl)phenoxy]octaflurobiphenyl;

aliphatic or alicyclic diamine compounds such as 1,1-m-xylylenediamine, 1,3-propanediamine, tetramethylenediamine, pentamethylenediamine, hexamethylenediamine, heptamethylenediamine, octamethylenediamine, nonamethylenediamine, 4,4-diaminohepthamethylenediamine, 1,4-diaminocyclohexane, isophoronediamine, tetrahydrodicyclopentadienylenediamine, hexahydro-4,7-methanoindanylenedimethylenediamine, tricyclo [6,2,1,0$^{2,7}$]-undecylenedimethyldiamine and 4,4'-methylenebis(cyclohexylamine); and steroid-structure-possessing diamine compounds of the following formulae (18) to (21).

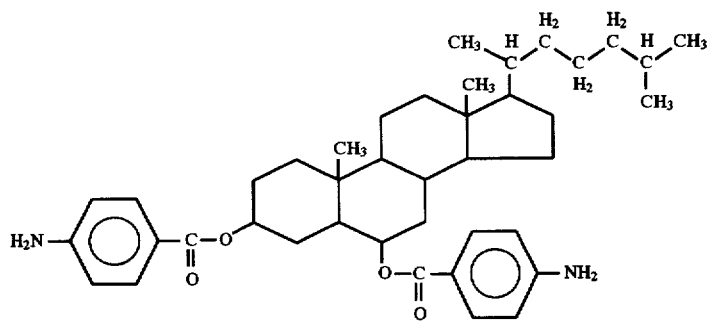

-continued

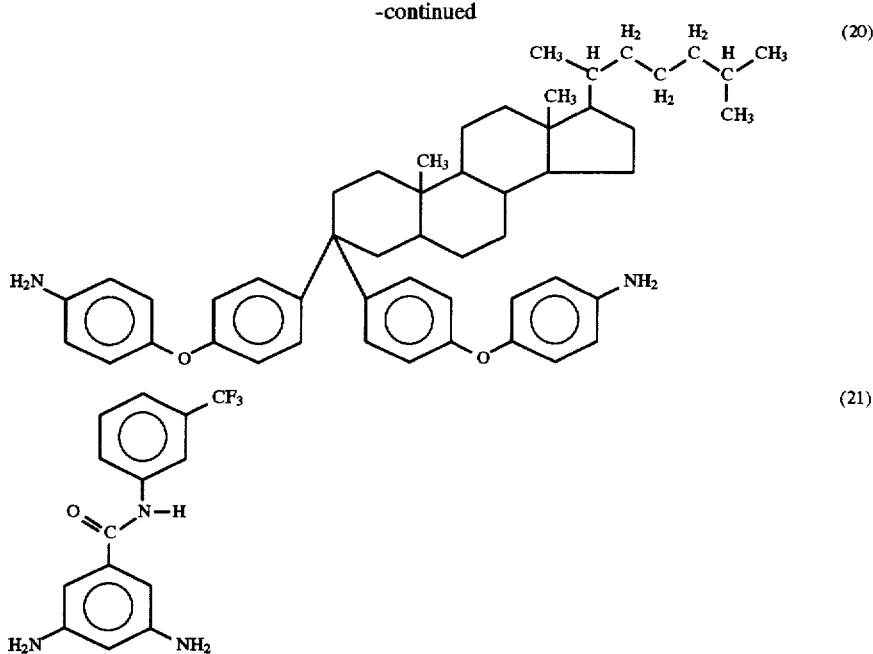

Of the above compounds, preferred are p-phenylenediamine, 4,4'-diaminodiphenylmethane, 1,5-diaminonaphthalene, bis(4-aminophenyl)-1,4-diisopropylbenzene, 4,4'-diaminodiphenyl ether and 4,4'-(p-phenyleneisopropylidene)bisaniline.

The above diamine compounds may be used alone or in combination.

In the present invention, the amount of the "other diamine compound" based on the total diamine compound amount is 0 to 99.9 mol %, and preferably, the above amount for a TN liquid crystal display device is 95 to 99 mol %, the above amount for an STN liquid crystal display device is 80 to 95 mol %, and the above amount for an SH liquid crystal display device is 0 to 50 mol %.

Tetracarboxylic acid dianhydride

The tetracarboxylic acid dianhydride used in the present invention includes the following compounds.

Aliphatic or alicyclic tetracarboxylic acid dianhydrides such as butanetetracarboxylic acid dianhydride, 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 3,5,6-tricarboxynorbornane-2-acetic acid dianhydride, 2,3,4,5-tetrahydrofurantetracarboxylic acid dianhydride, 1,3,3a,4,5, 9b-hexahydro-5-(tetrahydro-2,5-dioxo-3-furanyl)-naphtho [1,2-c]-furan-1,3-dione, 1,3,3a,4,5,9b-hexahydro-5-methyl-5-(tetrahydro-2,5-dioxo-3-furanyl)-naphtho[1,2-c]-furan-1, 3-dione, 1,3,3a,4,5,9b-hexahydro-8-methyl-5-(tetrahydro-2, 5-dioxo-3-furanyl)-naphtho[1,2-c]-furan-1,3-dione, 5-(2,5-dioxotetrahydrofura)-3-methyl-3-cyclohexene-1,2-dicarboxylic acid dianhydride and bicyclo[2,2,2]-oct-7-ene-2,3,5,6-tetracarboxylic acid dianhydride; and aromatic tetracarboxylic acid dianhydrides such as pyromellitic acid dianhydride, 3,3',4,4'-benzophenonetetracarboxylic acid dianhydride, 3,3',4, 4'-biphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-biphenyl ether tetracarboxylic acid dianhydride, 3,3',4,4'-dimethyldiphenylsilanetetracarboxylic acid dianhydride, 3,3',4,4'-tetraphenylsilanetetracarboxylic acid dianhydride, 1,2,3,4-furantetracarboxylic acid dianhydride, 4,4'-bis(3,4-dicarboxyphenoxy) diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic acid dianhydride, 3,3',4,4'-biphenyltetracarboxylic acid dianhydride, bis (phthalic acid)phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenyl ether dianhydride and bis(triphenylphthalic acid)-4,4'-diphenylmethane dianhydride.

Of the above compounds, preferred are pyromellitic acid dianhydride, 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 1,3,3a,4,5,9b-hexahydro-5-(tetrahydro-2,5-dioxo-3-furanyl)-naphtho[1,2-c]-furan-1,3-dione, 1,3,3a,4, 5,9b-hexahydro-5-methyl-5-(tetrahydro-2,5-dioxo-3-furanyl)naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 5-(2,5-dioxotetrahydrofural)-3-methyl-3-cyclohexene-1,2-dicarboxylic acid dianhydride and bicyclo[2,2,2]-oct-7-ene-2,3,5,6-tetracarboxylic acid dianhydride. Particularly preferred are pyromellitic acid dianhydride, 1,2,3,4-cyclobutanetetracarboxylic acid dianhydride, 2,3,5-tricarboxycyclopentylacetic acid dianhydride and 1,3,3a,4, 5,9b-hexahydro-8-methyl-5-(tetrahydro-2,5-dioxo-3-furanyl)-naphtho[1,2-c]-furan-1,3-dione. The above compounds may be used alone or in combination.

Polyamic acid

The specific polymer I (polyamic acid) used in the present invention can be obtained by reacting a diamine compound containing the specific diamine compound with the tetracarboxylic acid dianhydride. The reaction is carried out in an organic solvent at a reaction temperature of, generally, between 0° C. and 150° C., preferably, between 0° C. and 100° C.

The amount ratio of the tetracarboxylic acid dianhydride and the diamine compound is set as follows. The amount of acid anhydride groups of the tetracarboxylic acid dianhydride per equivalent weight of amino groups of the diamine compound is preferably 0.2 to 2 equivalent weights, more preferably 0.3 to 1.2 equivalent weights.

The above organic solvent is not specially limited so long as it can dissolve the specific polymer I formed in the reaction. For example, the organic solvent includes aprotic polar solvents such as N-methyl-2-pyrrolidone, N,N-dimethylacetamide, N,N-dimethylformamide, dimethyl sulfoxide, γ-butyrolactone, propylene carbonate, tetramethylurea and hexamethylphosphorylamide; and phenol-containing solvents such as m-cresol, xylenol, phenol and halogenated phenol. The amount of the organic solvent is generally preferably set as follows. The total amount of the tetracarboxylic acid dianhydride and the diamine compound is 0.1 to 30 % by weight based on the total amount of the reaction mixture.

The above organic solvent may contain a poor solvent such as an alcohol, a ketone, an ester, an ether, a halogenated hydrocarbon or a hydrocarbon in such an amount that the formed polymer is not precipitated. The poor solvent includes methyl alcohol, ethyl alcohol, tetrahydrofuryl alcohol, diacetone alcohol, isopropyl alcohol, cyclohexanol, ethylene glycol, propylene glycol, 1,4-butanediol, triethylene glycol, ethylene glycol monomethyl ether, acetone, methyl ethyl ketone, methyl isobutyl ketone, cyclohexanone, methyl lactate, ethyl lactate, butyl lactate, methyl acetate, ethyl acetate, butyl acetate, diethyl oxalate, diethyl malonate, diethyl ether, ethylene glycol methyl ether, ethylene glycol ethyl ether, ethylene glycol-n-propyl ether, ethylene glycol-i-propyl ether, ethylene glycol-n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, tetrahydrofuran, dichloromethane, 1,2-dichloroethane, 1,4-dichlorobutane, trichloroethane, chlorobenzene, o-dichlorobenzene, hexane, heptane, octane, benzene, toluene and xylene.

The so-obtained specific polymer I of the present invention has a recurring unit of the formula (22),

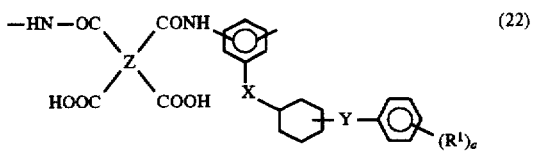
(22)

wherein $R^1$, X, Y and a are as defined above, and Z is a moiety formed by the removal of two acid anhydride groups from the tetracarboxylic acid dianhydride.

Polyimide

The specific polymer II (polyimide) used in the present invention can be obtained by imidating the above specific polymer I under heat or in the presence of a dehydrating agent and an imidating catalyst. The reaction temperature for the imidation under heat is generally 60° to 250° C., preferably 100° to 170° C. When the reaction temperature is lower than 60° C., the reaction proceeds at a low rate. When it is higher than 250° C., the molecular weight of the specific polymer II extremely decreases in some cases. When the imidation is carried out in the presence of a dehydrating agent and an imidating catalyst, the reaction may be carried out in the above organic solvent. The reaction temperature is generally between 0° C. and 180° C., preferably between 60° C. and 150° C. The dehydrating agent can be selected from acetic anhydride, propionic anhydride, trifluoroacetic anhydride. The imidating catalyst can be selected from tertiary amines such as pyridine, collidine, lutidine and triethylamine, although the imidating catalyst shall not be limited to these. The amount of the dehydrating agent is preferably 1.6 to 20 mol per mole of recurring units of the specific polymer I. The amount of the imidating catalyst is preferably 0.5 to 10 mol per mole of the dehydrating agent. Further, the imidation ratio can be adjusted by adjusting the conditions of the imidation as required.

The so-obtained specific polymer II of the present invention has a recurring unit of the formula (23),

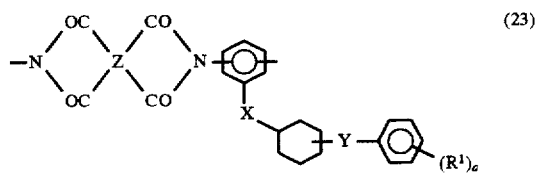
(23)

wherein $R^1$, X, Y, a and Z are as defined above.

Inherent viscosity of polyamic acid or polyimide

The inherent viscosity ($[\eta]_{inh}$=(ln $\eta_{rel}$)/C, C=0.5 g/dl, 30° C., in N-methyl-2-pyrrolidone); (an inherent viscosity of samples were measured under the same conditions hereinafter)) of the so-obtained specific polymer I or II is preferably 0.05~10 dl/g, more preferably 0.05~5 dl/g.

Liquid crystal aligning agent

The liquid crystal aligning agent of the present invention comprises an active active component composed of the polyamic acid and/or the polyimide of the present invention and an organic solvent, in which the active component is dissolved in the organic solvent. The organic solvent constituting the liquid crystal aligning agent includes the aprotic polar solvents and the phenol-containing solvents which are specified as those used for the synthesis and imidation of the polyamic acid. Further, those poor solvents which are described as usable in combination for the synthesis of the polyamic acid may be used in combination as required.

The concentration of the active component (polyamic acid and/or polyimide) of the liquid crystal aligning agent of the present invention is selected in view of viscosity and volatility, while it is preferably in the range of from 1 to 10 % by weight. A solution of the liquid crystal aligning agent is applied to a substrate surface by a printing method, a spin coating method, or the like, and an applied solution is dried to form a coating of the liquid crystal aligning agent. When the concentration of the active component is less than 1 % by weight, the thickness of the coating is too small to obtain an excellent liquid crystal aligning film. When the concentration of the active component exceeds 10 % by weight, the thickness of the coating is too large to obtain an excellent liquid crystal aligning film. Further, the viscosity of the liquid crystal aligning agent is high and the solution is poor in application properties.

The liquid crystal aligning agent of the present invention may contain a functional silane-containing compound and an epoxy-containing crosslinking agent for further improving the adhesion of the specific polymer and/or the specific polymer II to a substrate.

The above functional silane-containing compound includes 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3- aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane and N-bis(oxyethylene)-3-aminopropyltriethoxysilane.

The above epoxy-containing crosslinking agent preferably includes polyethylene glycol diglycidyl ether, diglycidyl orhtotoluidine, tetraglycidylaminodiphenylmethane and 1,3-bis(N,N'-diglycidylaminomethyl)cyclohexane.

Liquid crystal display device

A liquid crystal display device for which the liquid crystal aligning agent of the present invention is adapted can be produced, for example, by the following method.

(1) The liquid crystal aligning agent is coated on the transparent electrically conductive film side of a substrate provided with a transparent electrically conductive film by a roll coating method, a spinner method or a printing method, and an applied surface is heated to form a coating.

The above substrate can be selected from a transparent substrate of glass such as float glass or soda glass and a transparent substrate formed of a plastic film of polyethylene terephthalate, polybutylene terephthalate, polyether sulfone or polycarbonate. The transparent electrically conductive film formed on one surface of the substrate includes an NESA film formed of $SnO_2$ and an ITO film formed of $In_2O_3$—$SnO_2$. The patterning of the transparent electrically conductive film can be carried out by a photo-etching method or a method using a mask in advance.

When the liquid crystal aligning agent is applied, a functional silane-containing compound or titanate may be applied onto the substrate and the transparent electrically conductive film in advance for improving the adhesion of the substrate and the transparent electrically conductive film to the coating. The heating temperature is preferably between 80° C. and 250° C., more preferably between 120° C. and 250° C. The thickness of the formed coating is generally 0.001 to 1 µm, preferably 0.005 to 0.5 µm.

(2) The formed coating is rubbing-treated with a roll wrapped with a synthetic fiber such as a nylon fiber to form a liquid crystal aligning film.

(3) Two substrates each of which is provided with the liquid crystal aligning film as described above are positioned such that the rubbing directions are at right angles or in counter directions, and peripheral portions of the substrates are sealed with a sealing agent. A liquid crystal is charged, and a charging hole is sealed to form a liquid crystal cell. Then, polarization plates are attached to the cell, one plate to one surface of the cell and the other plate to the other surface, such that the polarization directions are in the same directions as, or at right angles with, the rubbing directions of the liquid crystal aligning film of the substrate, to form a liquid crystal display device.

The above sealing agent includes an epoxy resin containing a curing agent and aluminum oxide particles as a spacer.

The above liquid crystal is selected from nematic liquid crystals or smectic liquid crystals, and of these, preferred are those which form nematic liquid crystals. For example, the liquid crystal includes a Schiff's base liquid crystal, an azoxy liquid crystal, a biphenyl liquid crystal, a phenyl cyclohexane liquid crystal, an ester liquid crystal, terphenyl liquid crystal, biphenyl cyclohexane liquid crystal, a pyrimidine liquid crystal, a dioxane liquid crystal, bicyclooctane liquid crystal and a cuban liquid crystal. Further, the above liquid crystal may additionally contain a cholesteric liquid crystal such as cholesteryl chloride, cholesterylnonate or cholestyl carbonate, or a chiral agent which is available, e.g., in the trade name of C-15 orr CB-15 (Merck Ltd.). Further, a ferroelectric liquid crystal such as p-desiloxybenzylidene-p-amino-2-methylbutyl cinnamate may be used.

The polarizer attached to the outside of the liquid crystal cell is selected from a polarizer obtained by stretching a polyvinyl alcohol to orient it while allowing it to absorb iodine to form a polarizing film called a H film between cellulose acetate protective films and a polarizer formed of the H film only.

The visible field characteristics of the liquid crystal display device can be improved by a treatment in which the liquid crystal aligning film formed of the liquid crystal aligning agent is exposed to ultraviolet light to change a pre-tilt angle as disclosed in JP-A-6-222366 and JP-A-6-281937 or by a treatment in which a resist is partly formed on a rubbing-treated liquid crystal aligning film, then, the liquid crystal aligning film is rubbing-treated in a direction different from the direction of the preceding rubbing treatment and then the resist film was removed to change the alignment capability of the liquid crystal aligning film, as disclosed in JP-A-5-107544.

The present invention will be explained more specifically with reference to Examples hereinafter, while the present invention shall not be limited by these Examples.

In Examples, pre-tilt angles were measured by a crystal rotation method using He—Ne laser beam according to the method described in T. J. Schffer, et al., J. Appl. Phys. 19, 2013 (1980).

Further, liquid crystal cells were evaluated for alignment characteristics as follows. The liquid crystal cells were observed for abnormal domains with a polarization microscope when a voltage was switched on and off, and a case where no abnormal domain was found was regarded excellent.

Synthesis Example 1 of specific diamine compound

Step (i)

23.06 Grams (100 mmol) of 3,5-dinitrobenzoic acid chloride and 34.85 g (300 mmol) of 1,4-dihydroxycyclohexane were dissolved in 400.00 g of tetrahydrofuran. Then, 7.91 g (100.00 mmol) of pyridine was gradually dropwise added with stirring and cooling with ice. The mixture was allowed to react for 6 hours, and then the reaction mixture was poured into a large excess of water, a precipitate was collected by filtration, and recrystallized from methyl ethyl ketone to give a white dinitro compound.

Step (ii)

24.82 Grams (80.00 mmol) of the dinitro compound obtained in step (i) and 18.32 g (80.00 mmol) of p-trifluoromethylbenzoic acid chloride were dissolved in 400.00 g of tetrahydrofuran. Then, 6.33 g (80.00 mmol) of pyridine was gradually dropwise added with stirring and cooling with ice. The mixture was allowed to react for 6 hours, and then the reaction mixture was poured into a large excess of water. A precipitate was collected by filtration and recrystallized from methyl ethyl ketone to give a white dinitro compound.

Step (iii)

36.20 Grams (72.00 mmol) of the dinitro compound obtained in step (ii) was dissolved in 400 g of ethanol, and 0.30 g of a 5 wt % palladium-carbon catalyst and 5.6 g (100.00 mmol) of hydrazine-hydrate were added. The mixture was allowed to react under reflux for 6 hours. The reaction mixture was poured into a large excess of water, and a precipitate was collected by filtration and recrystallized from ethanol to give 24.33 g of a white specific diamine compound of the above formula (10).

Figure 2:
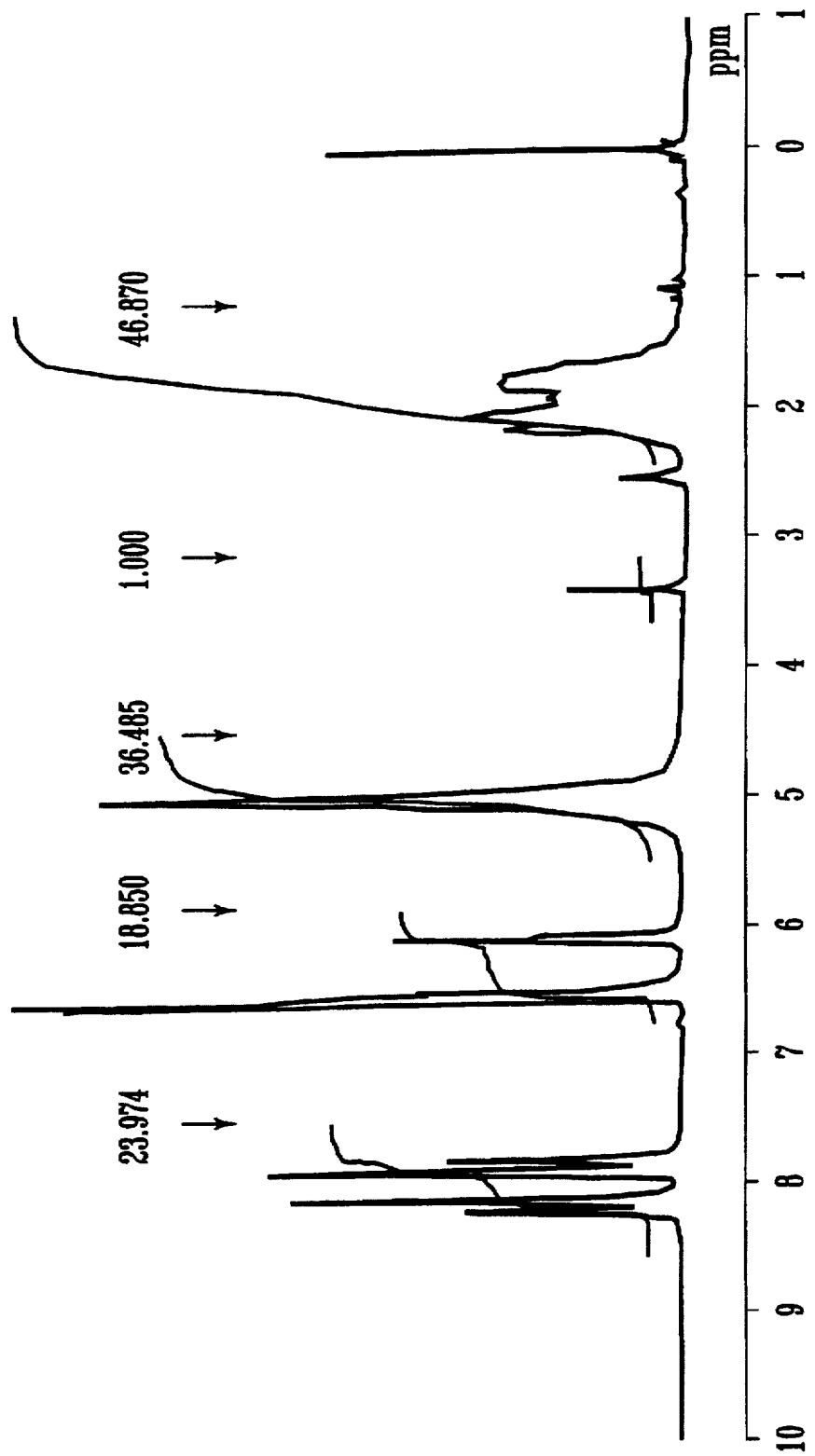
FIG. 2 is an NMR spectrum of the same diamine compound as the specific example in FIG. 1.

FIG. 1 shows the infrared absorption spectrum of the above-obtained specific diamine compound, and FIG. 2 shows the NMR spectrum thereof.

Synthesis Example 2 of specific diamine compound

Step (i)

23.06 Grams (100 mmol) of 3,5-dinitrobenzoic acid chloride and 34.85 g (300 mmol) of 1,4-dihydroxycyclohexane were dissolved in 400.00 g of tetrahydrofuran. Then, 7.91 g (100.00 mmol) of pyridine was gradually dropwise added with stirring and cooling with ice. The mixture was allowed to react for 6 hours, and then the reaction mixture was poured into a large excess of water, a precipitate was collected by filtration, and recrystallized from methyl ethyl ketone to give a white dinitro compound.

Step (ii)

24.82 Grams (80.00 mmol) of the dinitro compound obtained in step (i) and 12.68 g (80.00 mmol) of p-fluoromethylbenzoic acid chloride were dissolved in 400.00 g of tetrahydrofuran. Then, 6.33 g (80.00 mmol) of pyridine was gradually dropwise added with stirring and cooling with ice. The mixture was allowed to react for 6 hours, and then the reaction mixture was poured into a large excess of water. A precipitate was collected by filtration and recrystallized from methyl ethyl ketone to give a white dinitro compound.

Step (iii)

31.12 Grams (72.00 mmol) of the dinitro compound obtained in step (ii) was dissolved in 400 g of ethanol, and 0.30 g of a 5 wt% palladium-carbon catalyst and 5.6 g (100.00 mmol) of hydrazine-hydrate were added. The mixture was allowed to react under reflux for 6 hours. The reaction mixture was poured into a large excess of water, and a precipitate was collected by filtration and recrystallized from ethanol to give 24.33 g of a white specific diamine compound (ii) having a melting point of 196° C. and having the above formula (10).

Figure 3:
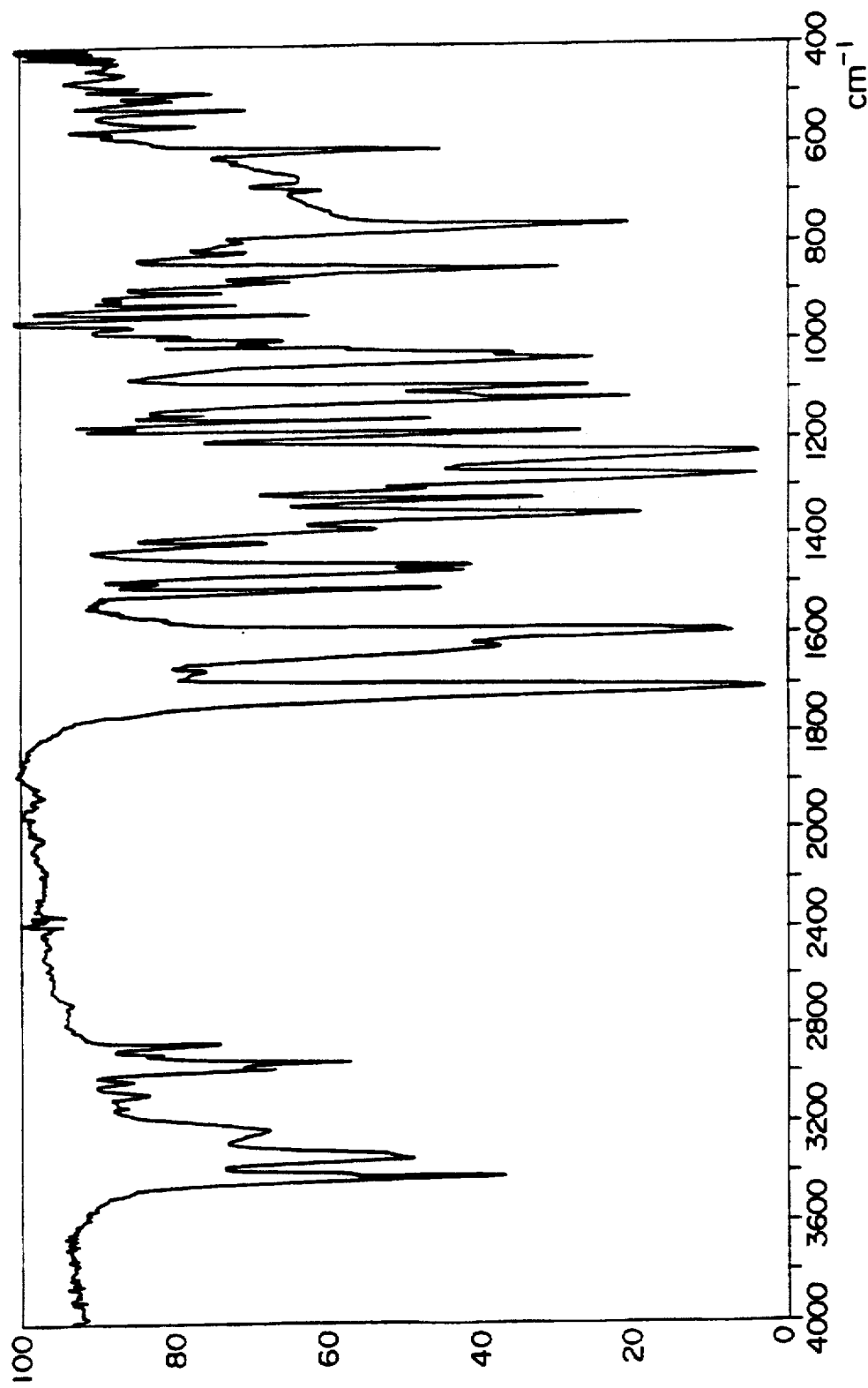
FIG. 3 is an infrared absorption spectrum of a specific example of the diamine compound used in the present invention.
Figure 4:
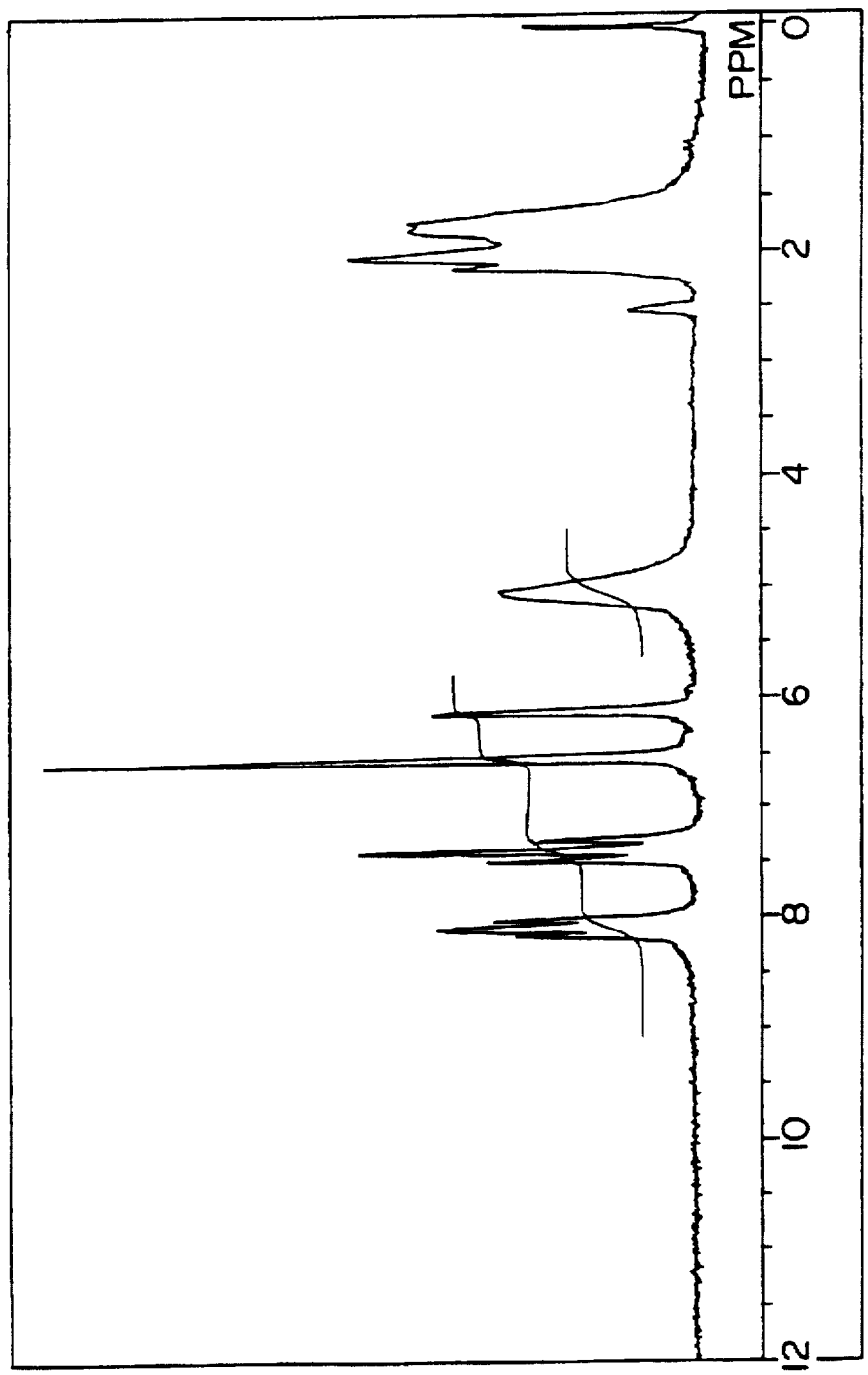
FIG. 4 is an NMR spectrum of the same diamine compound as the specific example in FIG. 3.

FIG. 3 shows the infrared absorption spectrum of the above-obtained specific diamine compound, and FIG. 4 shows the NMR spectrum thereof.

Synthesis Example 1

22.42 Grams (100.00 mmol) of 2,3,5-tricarboxycyclopentyl acetic acid dianhydride as a tetracarboxylic acid dianhydride, and 4.22 g (10.00 mmol) of the specific diamine compound of the formula (10) and 9.73 g (90.00 mmol) of p-phenylenediamine as diamine compounds were dissolved in 327.33 g of N-methyl-2-pyrrolidone, and the mixture was allowed to react at 60° C. for 6 hours.

Figure 5:
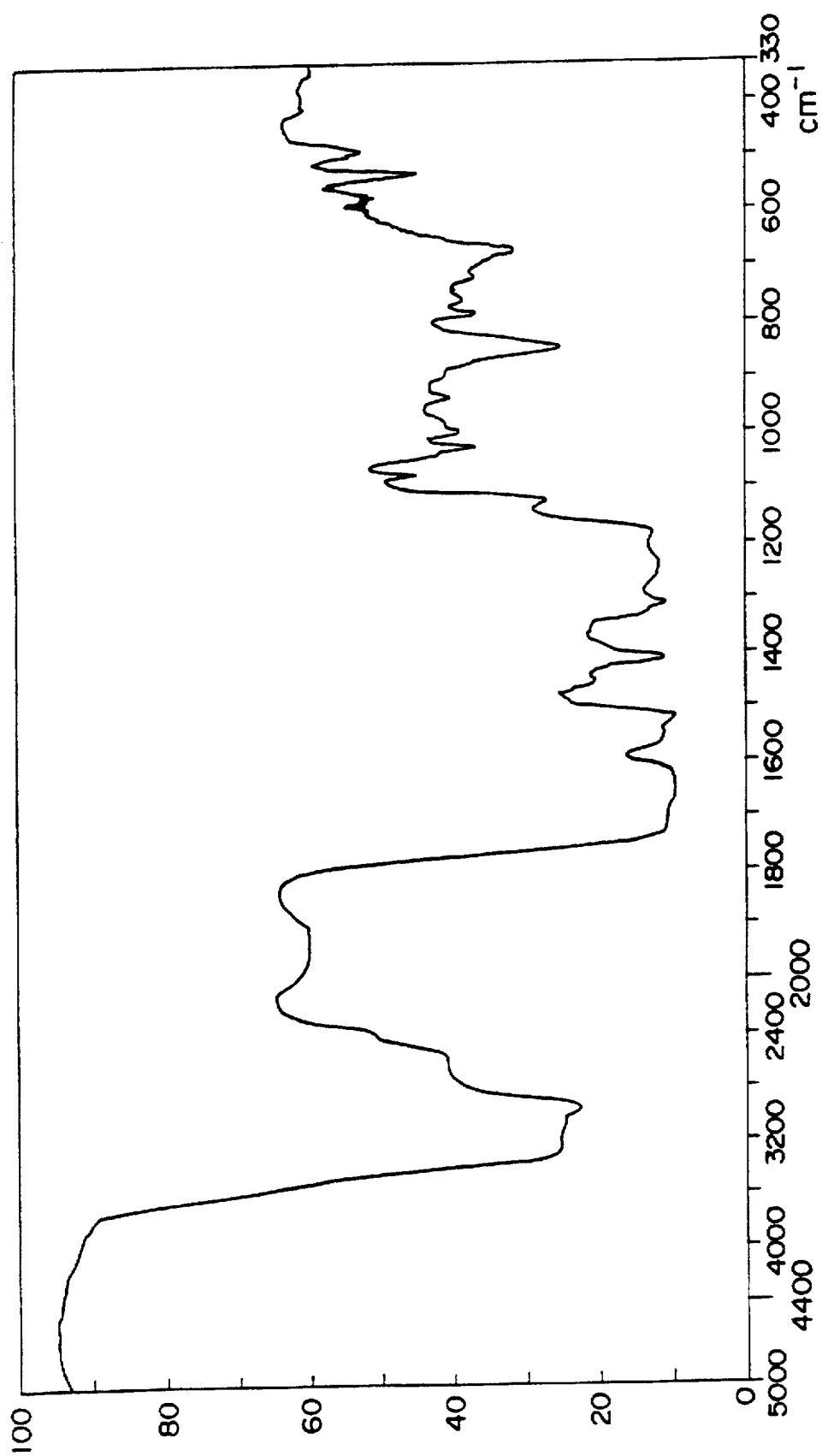
FIG. 5 is an infrared absorption spectrum of a specific example of the polyamic acid used in the present invention.
Figure 6:
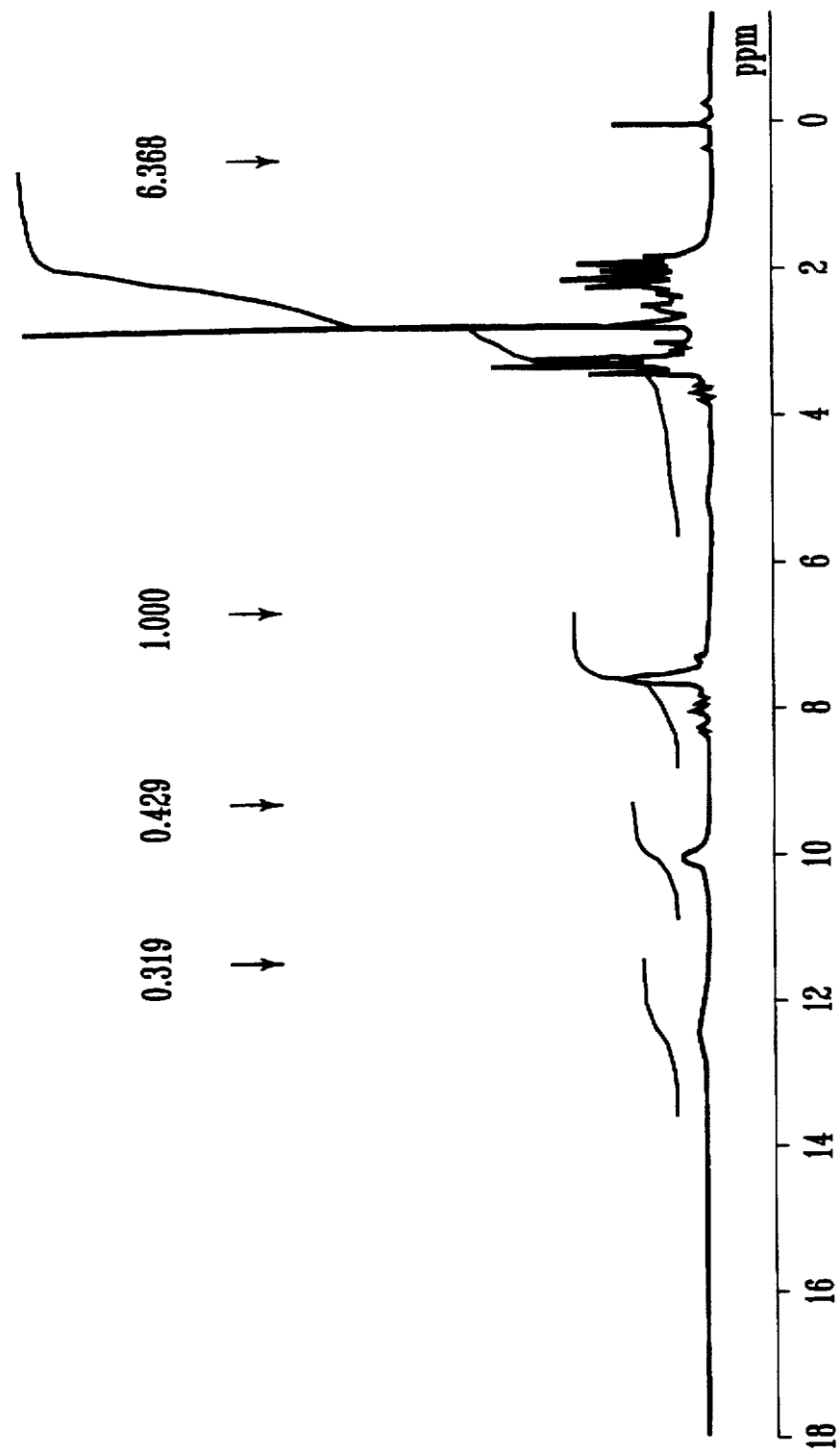
FIG. 6 is an NMR spectrum of the same polyamic acid as the specific example in FIG. 5.

Then, the reaction mixture was poured into a large excess of methanol to precipitate a reaction product. Then, the reaction product was washed with methanol and dried under reduced pressure at 40° C. for 15 hours to give a specific polymer Ia having an inherent viscosity of 1.20 dl/g. FIG. 5 shows the infrared absorption spectrum of the specific polymer Ia, and FIG. 6 shows the NMR spectrum thereof.

Synthesis Example 2

36.37 Grams of the specific polymer Ia obtained in Synthesis Example 1 was dissolved in 631.03 g of N-methyl-2-pyrrolidone, and 15.82 g of pyridine and 20.42 g of acetic anhydride were added. The mixture was subjected to an imidation reaction at 115° C. for 4 hours.

Figure 7:
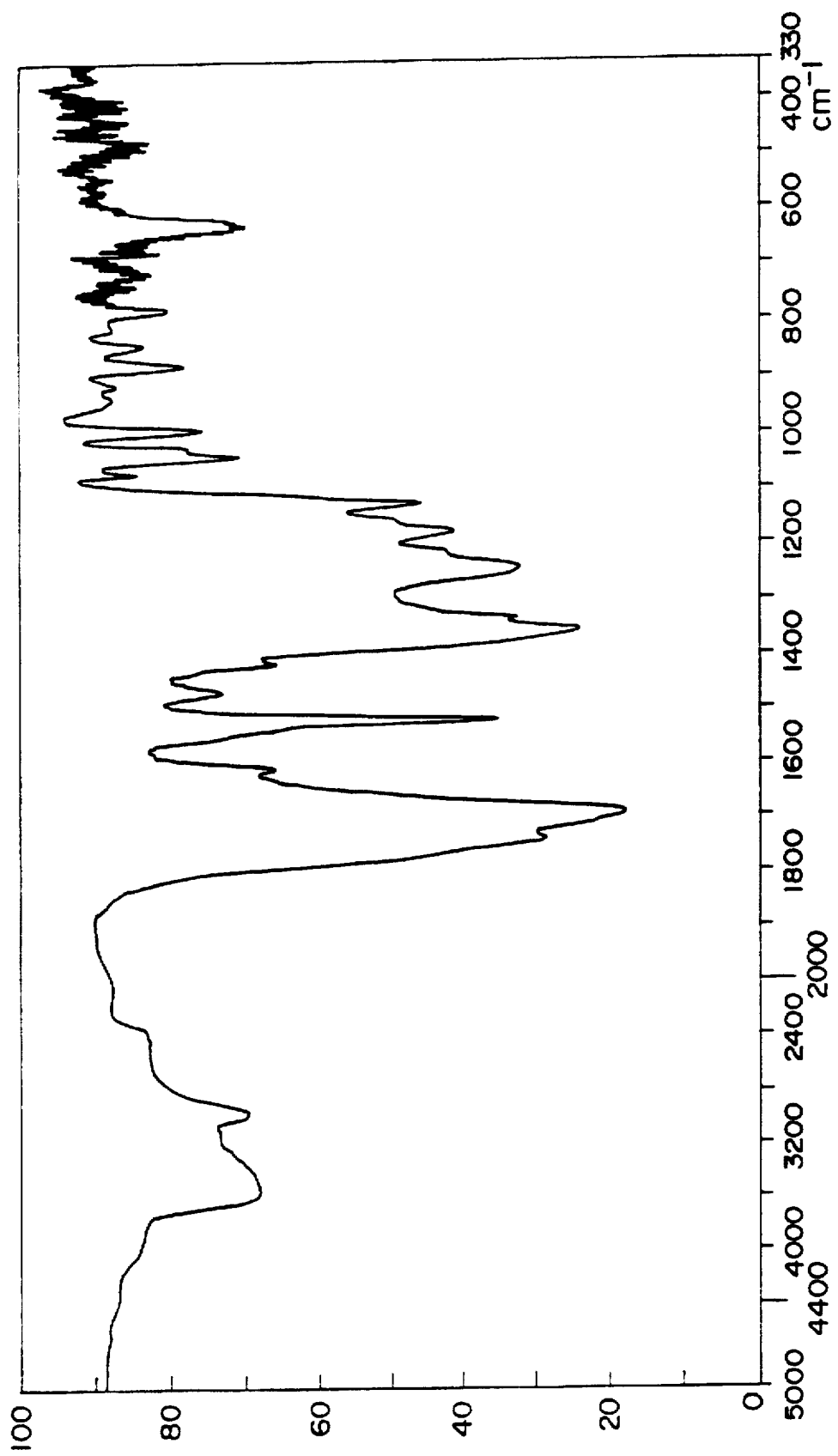
FIG. 7 is an infrared absorption spectrum of a specific example of the polyimide used in the present invention.
Figure 8:
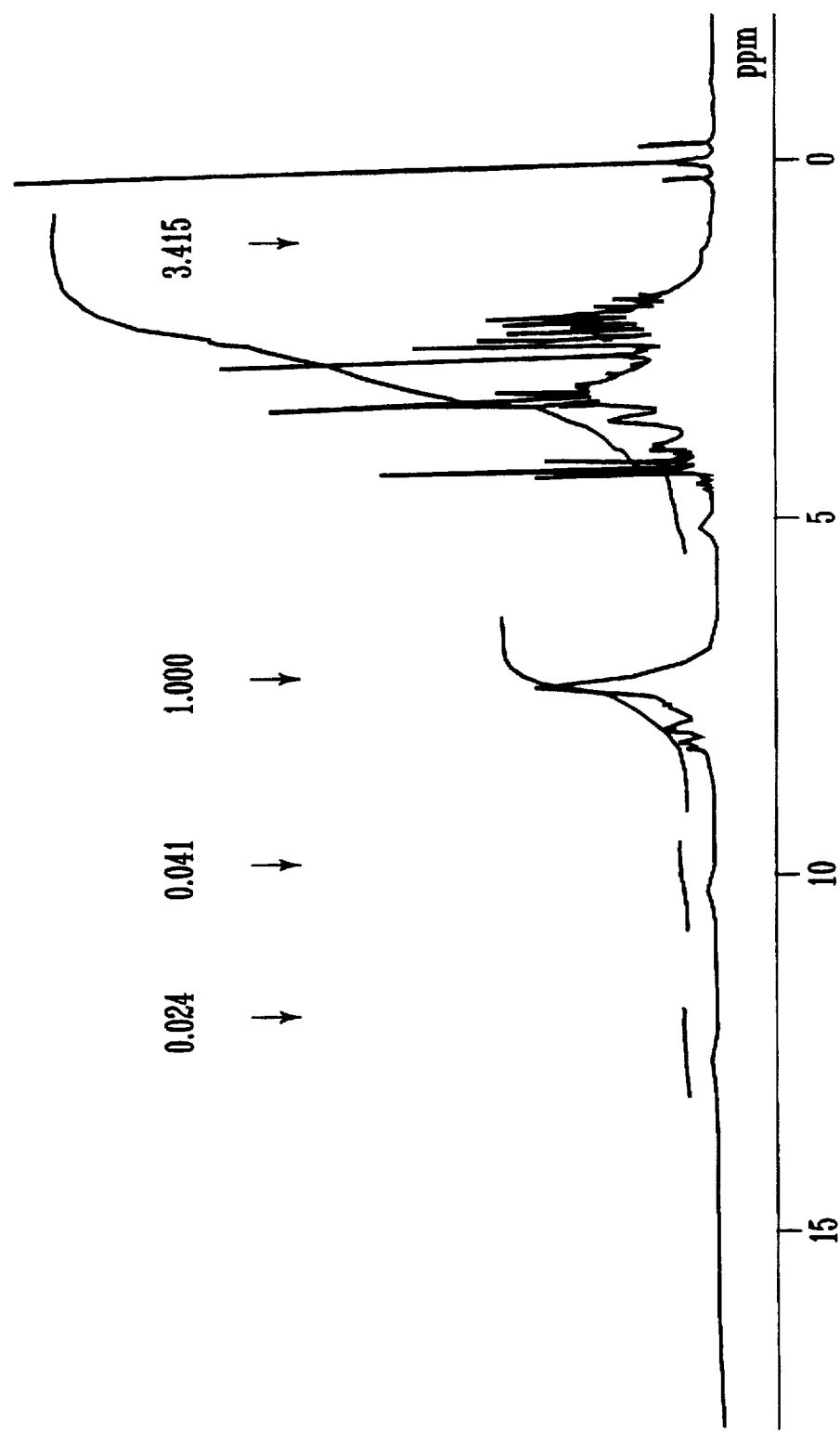
FIG. 8 is an NMR spectrum of the same polyimide as the specific example in FIG. 7.

A reaction product was precipitated in the same manner as in Synthesis Example 1 to give a specific polymer IIa having an inherent viscosity of 1.20 dl/g. FIG. 7 shows the infrared absorption spectrum of the specific polymer IIa, and FIG. 8 shows the NMR spectrum thereof.

Synthesis Example 3

22.42 Grams (100.00 mmol) of 2,3,5-tricarboxycyclopentylacetic acid dianhydride as a tetracarboxylic acid dianhydride, and 21.12 g (50 mmol) of the specific diamine compound of the above formula (10) and 5.41 g (50.00 mmol) of p-phenylenediamine as diamine compounds were 440.55 g N-methyl-2-pyrrolidone, and the mixture was allowed to react at 60° C. for 6 hours.

Then, the reaction mixture was poured into a large excess of methanol to precipitate a reaction product. Then, the reaction product was washed with methanol, and dried under reduced pressure at 40° C. for 15 hours to give a specific polymer Ib having an inherent viscosity of 1.00 dl/g.

Synthesis Example 4

48.95 Grams of the specific polymer Ib obtained in Synthesis Example 3 was dissolved in 930.05 g of N-methyl-2-pyrrolidone, and 15.82 g of pyridine and 20.42 g of acetic anhydride were added. The mixture was subjected to an imidation reaction at 115° C. for 4 hours.

A reaction product was precipitated in the same manner as in Synthesis Example 1 to give a specific polymer IIb having an inherent viscosity of 1.00 dl/g.

Synthesis Example 5

22.42 Grams (100.00 mmol) of 2,3,5-tricarboxycyclopentyl acetic acid dianhydride as a tetracarboxylic acid dianhydride and 44.24 g (100.00 mmol) of the specific diamine compound of the formula (10) as a diamine compound were dissolved in 581.94 g of N-methyl-2-pyrrolidone, and the mixture was allowed to react at 60° C. for 6 hours.

Figure 9:
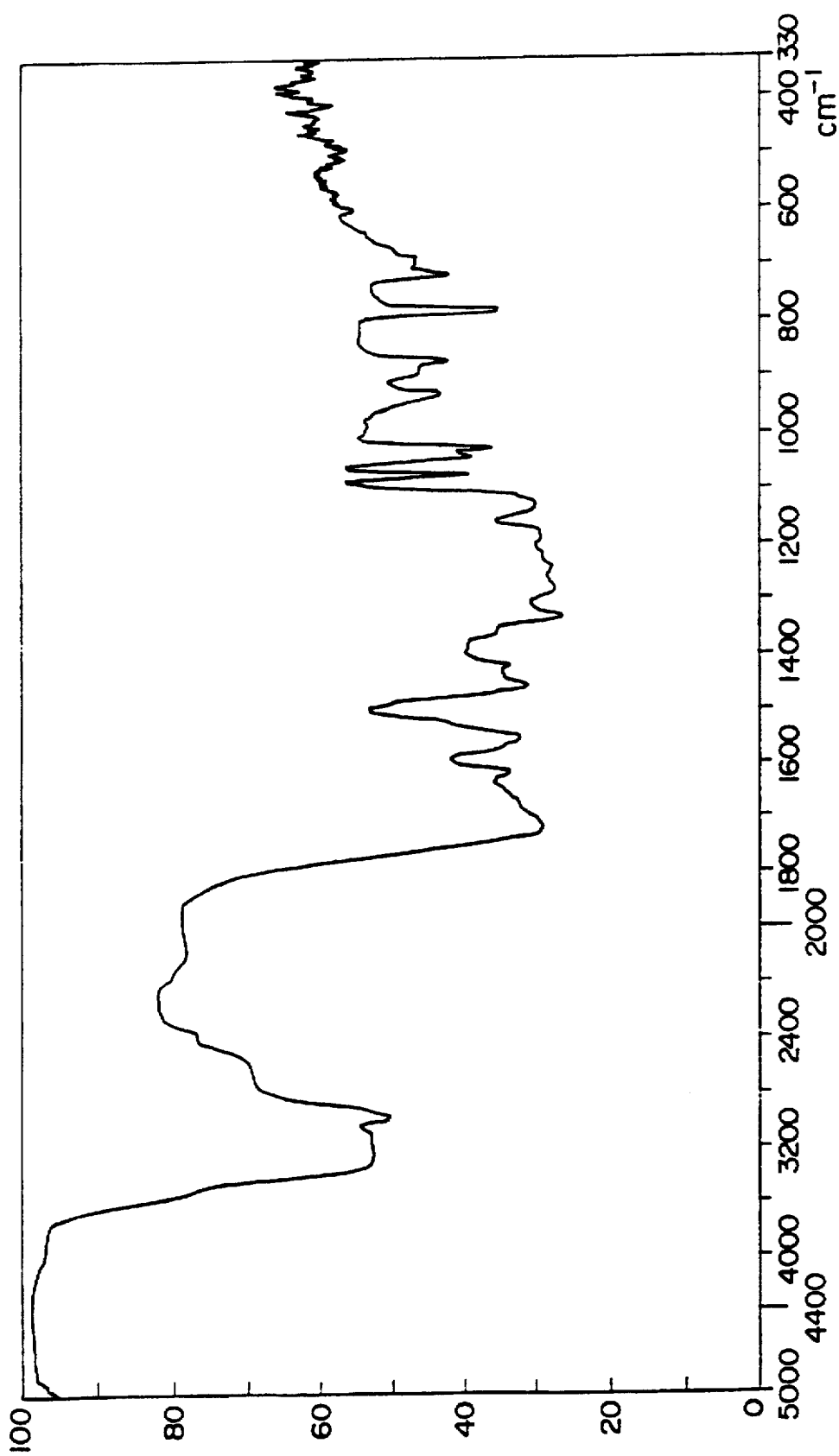
FIG. 9 is an infrared absorption spectrum of other specific example of the polyamic acid used in the present invention.
Figure 10:
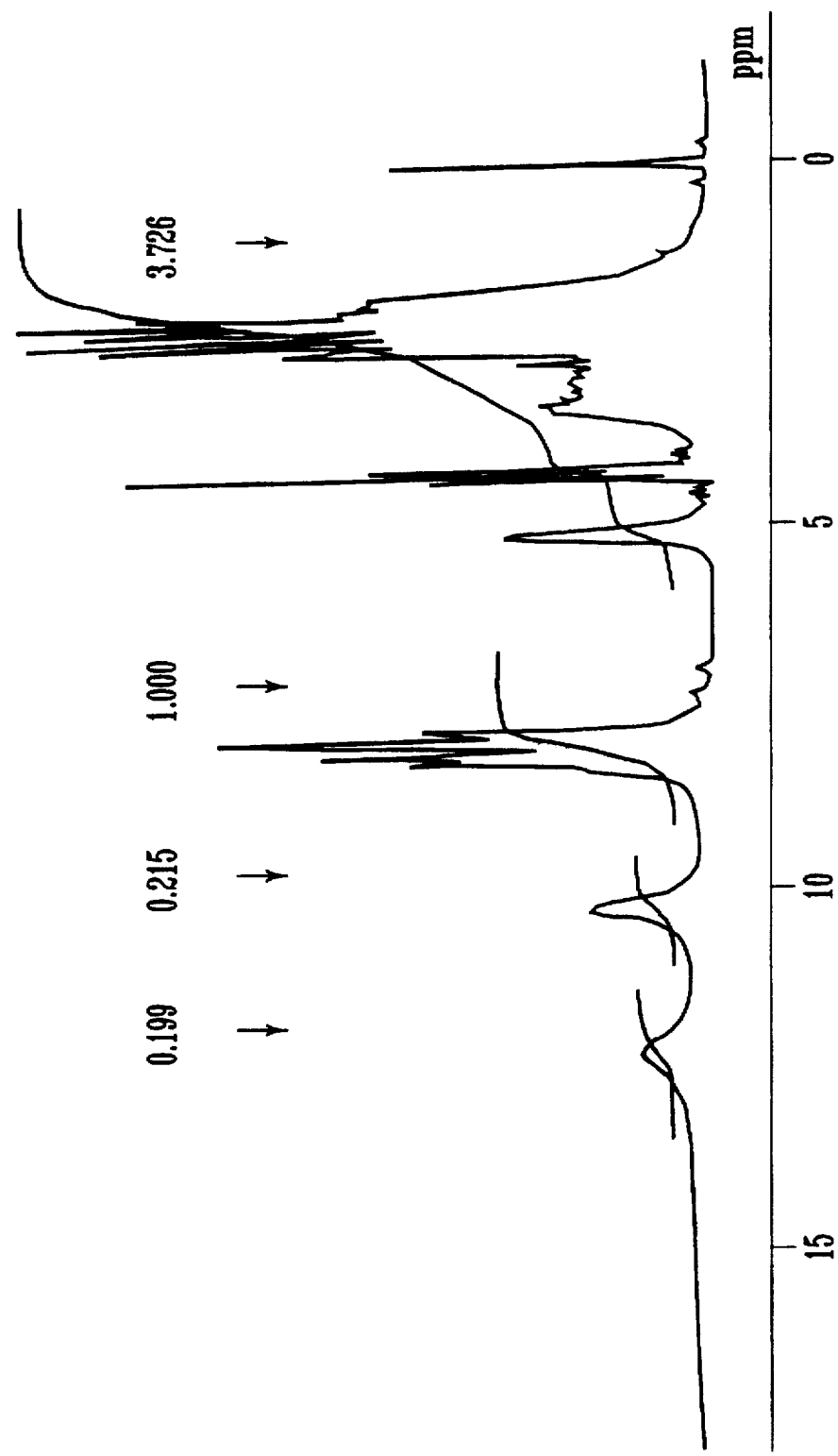
FIG. 10 is an NMR spectrum of the same polyamic acid as the specific example in FIG. 9.

Then, the reaction mixture was poured into a large excess of methanol to precipitate a reaction product. Then, the reaction product was washed with methanol and dried under reduced pressure at 40° C. for 15 hours to give a specific polymer Ic having an inherent viscosity of 0.80 dl/g. FIG. 9 shows the infrared absorption spectrum of the specific polymer Ic, and FIG. 10 shows the NMR spectrum thereof.

Synthesis Example 6

64.66 Grams of the specific polymer Ic obtained in Synthesis Example 5 was dissolved in 1,228.54 g of N-methyl-2-pyrrolidone, and 15.82 g of pyridine and 20.42 g of acetic anhydride were added. The mixture was subjected to an imidation reaction at 115° C. for 4 hours.

Figure 11:
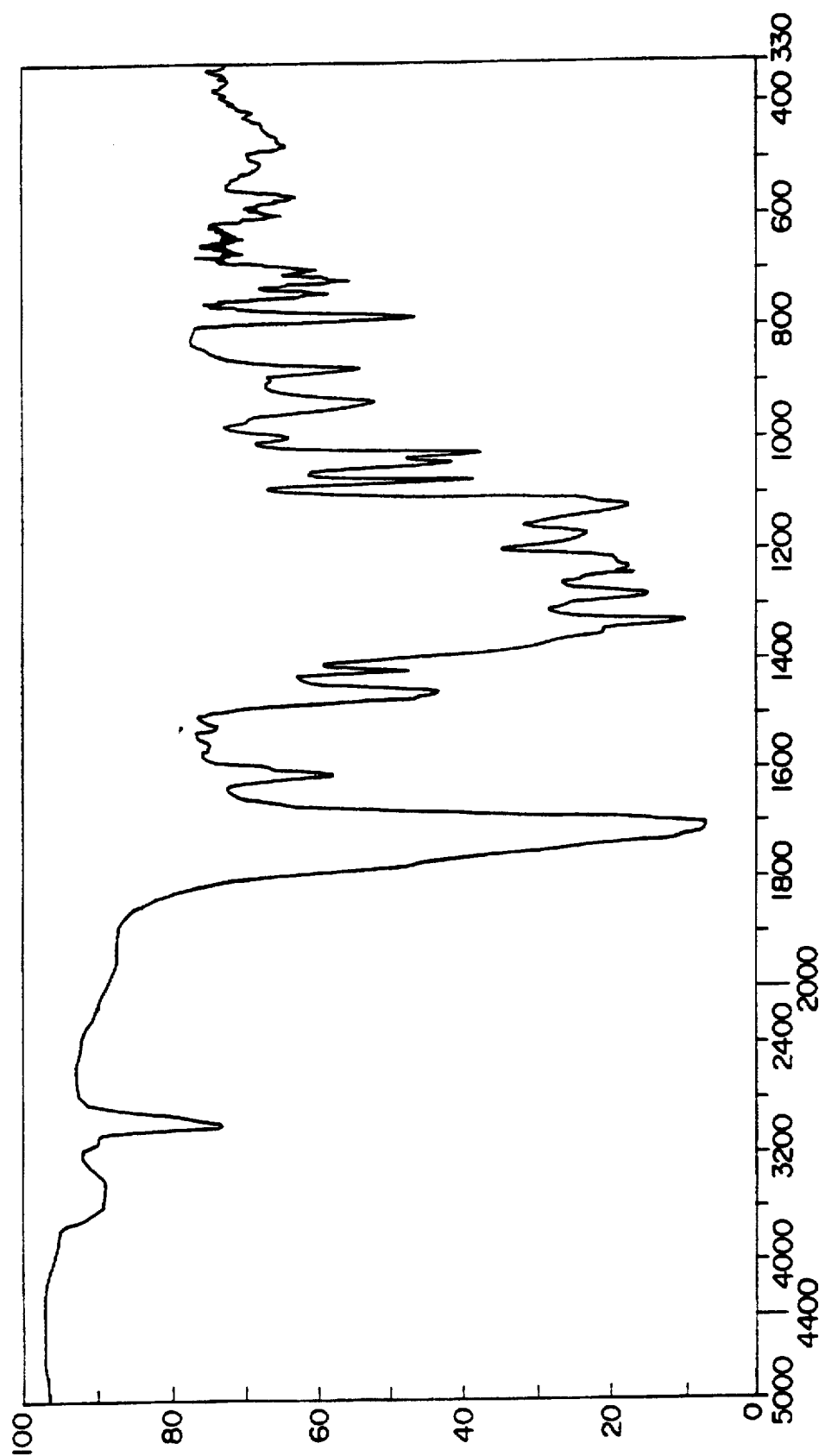
FIG. 11 is an infrared absorption spectrum of other specific example of the polyimide used in the present invention.
Figure 12:
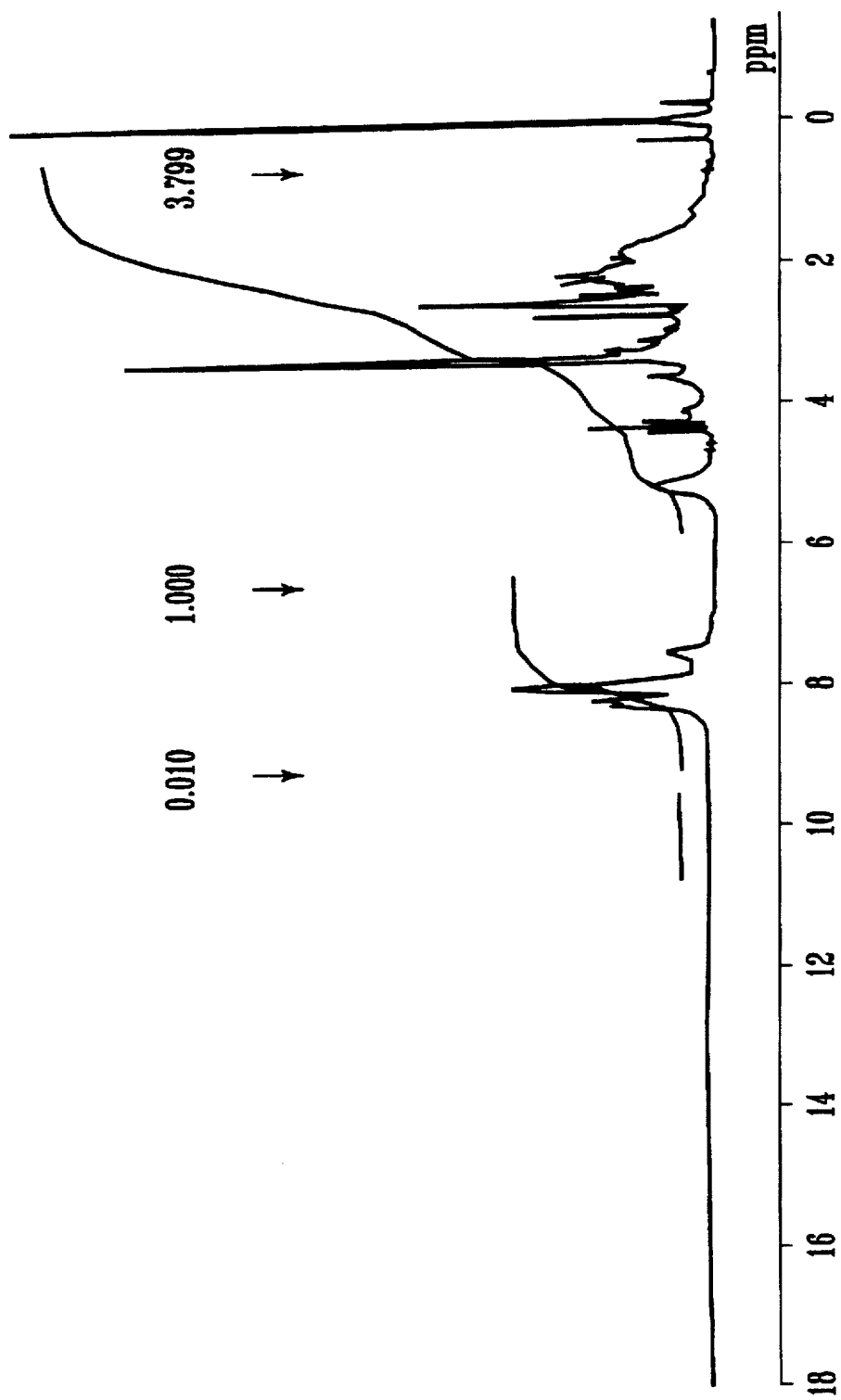
FIG. 12 is an NMR spectrum of the same polyimide as the specific example in FIG. 11.

Then, a reaction product was precipitated in the same manner as in Synthesis Example 1 to give a specific polymer IIc having an inherent viscosity of 0.80 dl/g. FIG. 11 shows the infrared absorption spectrum of the specific polymer IIc, and FIG. 12 shows the NMR spectrum thereof.

Synthesis Example 7

21.81 Grams (100.00 mmol) of pyromellitic acid dianhydride as a tetracarboxylic acid dianhydride, and 21.11 g (50.00 mmol) of the specific diamine compound of the formula (10) and 5.41 g (50.00 mmol) of p-phenylenediamine as diamine compounds were dissolved in 434.97 g of N-methyl-2-pyrrolidone, and the mixture was allowed to react at 60° C. for 6 hours.

Then, the reaction mixture was poured into a large excess of methanol to precipitate a reaction product. Then, the reaction product was washed with methanol and dried under reduced pressure at 40° C. for 15 hours to give a specific polymer Id having an inherent viscosity of 1.35 dl/g.

Synthesis Example 8

21.81 Grams (100.00 mmol) of pyromellitic acid dianhydride as a tetracarboxylic acid dianhydride, and 21.01 g (50.00 mmol) of the specific diamine compound of the formula (11) and 5.41 g (50.00 mmol) of p-phenylenediamine as diamine compounds were dissolved in 434.07 g of N-methyl-2-pyrrolidone, and the mixture was allowed to react at 60° C. for 6 hours.

Then, the reaction mixture was poured into a large excess of methanol to precipitate a reaction product. Then, the reaction product was washed with methanol and dried under reduced pressure at 40° C. for 15 hours to give a specific polymer Ie having an inherent viscosity of 1.40 dl/g.

Synthesis Example 9

21.81 Grams (100.00 mmol) of pyromellitic acid dianhydride as a tetracarboxylic acid dianhydride, and 18.41 g (50.00 mmol) of the specific diamine compound of the formula (12) and 5.41 g (50.00 mmol) of p-phenylenediamine as diamine compounds were dissolved in 410.67 g of N-methyl-2-pyrrolidone, and the mixture was allowed to react at 60° C. for 6 hours.

Then, the reaction mixture was poured into a large excess of methanol to precipitate a reaction product. Then, the reaction product was washed with methanol and dried under reduced pressure at 40° C. for 15 hours to give a specific polymer If having an inherent viscosity of 1.30 dl/g.

Synthesis Example 10

26.72 Grams (85 mmol) of 1,3,3a,4,5,9a-hexahydro-8-methyl-5(tetrahydro-2,5-dioxo-3-furanyl)naphtho[1,2-c]furan-1,3-dione and 3.36 g (15 mmol) of 1,3-dimethylcyclobutanetetracarboxylic acid dianhydride as tetracarboxylic acid dianhydrides, and 8.11 g (75 mmol) of 1,4-phenylenediamine, 2.97 g (15 mmol) of 4,4'-diaminodiphenylmethane and 4.22 g (10.00 mmol) of the specific compound of the formula (10) as diamine compounds, were dissolved in 408.42 g of N-methyl-2-pyrrolidone, and the mixture was allowed to react at 60° C. for 6 hours.

Then, the reaction mixture was poured into a large excess of methanol to precipitate a reaction product. Then, the reaction product was washed with methanol and dried under reduced pressure at 400° C. for 15 hours to give a specific polymer Ig having an inherent viscosity of 1.10 dl/g.

Synthesis Example 11

45.38 Grams of the specific polymer Ig obtained in Synthesis Example 10 was dissolved in 862.22 g of N-methyl-2-pyrrolidone, and 15.82 g of pyridine and 20.42 g of acetic anhydride were added. The mixture was subjected to an imidation reaction at 115° C. for 4 hours.

Then, a reaction product was precipitated in the same manner as in Synthesis Example 1 to give a specific polymer IIg having an inherent viscosity of 1.10 dl/g.

Synthesis Example 12

22.42 Grams (100.00 mmol) of 2,3,5-tricarboxycyclopentyl acetic acid dianhydride as a tetracarboxylic acid dianhydride, and 3.72 g (10.00 mmol) of the specific diamine compound (ii) and 9.37 g (90.00 mmol) of p-phenylenediamine as diamine compounds were dissolved in 327.33 g of N-methyl-2-pyrrolidone, and the mixture was allowed to react at 60° C. for 6 hours. Then, the reaction mixture was poured into a large excess of methanol to precipitate a reaction product. Then, the reaction product was washed with methanol and dried under reduced pressure at 40° C. for 15 hours to give a specific polymer Ih having an inherent viscosity of 1.10 dl/g. 36.37 Grams of the specific polymer Ih was dissolved in 631.03 g of N-methyl-2-pyrrolidone, and 15.82 g of pyridine and 20.42 g of acetic anhydride were added. The mixture was subjected to an imidation reaction at 115° C. for 4 hours.

Figure 13:
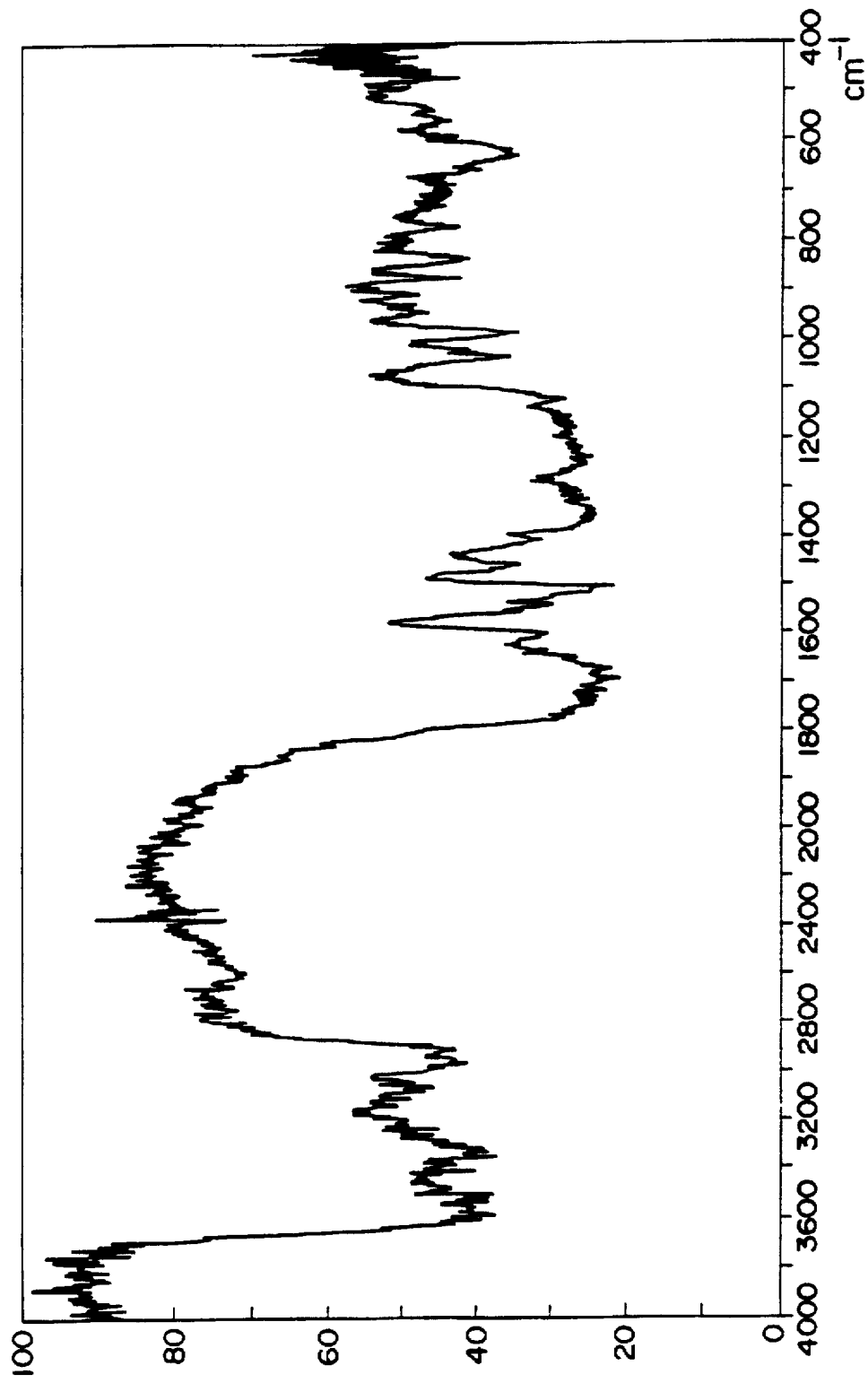
FIG. 13 is an infrared absorption spectrum of other specific example of the polyimide used in the present invention.
Figure 14:
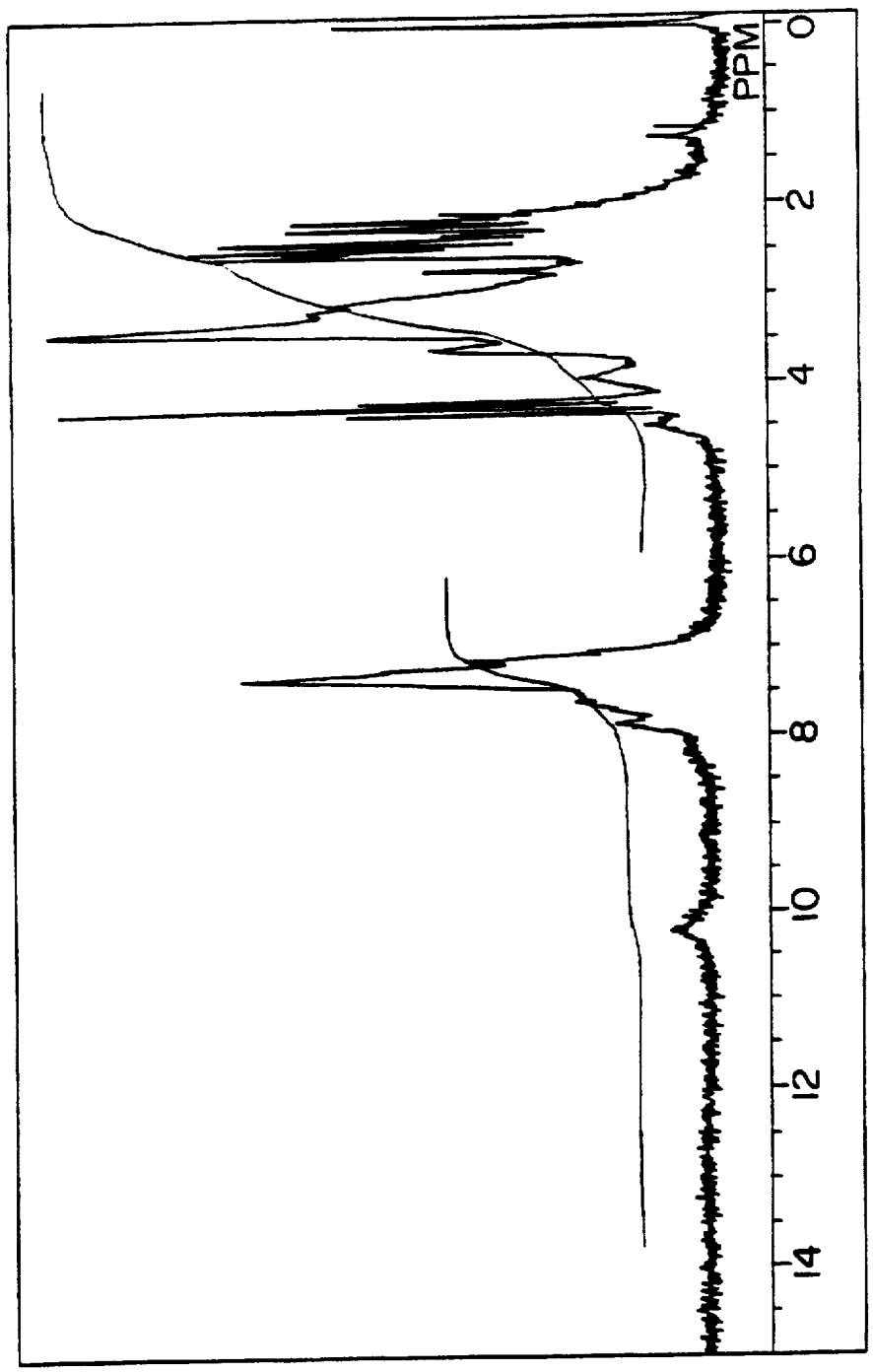
FIG. 14 is an NMR spectrum of the same polyimide as the specific example in FIG. 13.

Then, a reaction product was precipitated in the same manner as in Synthesis Example 1 to give a specific polymer IIh having an inherent viscosity of 1.0 dl/g. FIG. 13 shows the infrared absorption spectrum of the specific polymer IIh, and FIG. 14 shows the NMR spectrum thereof.

Synthesis Example 13 (Comparative Synthesis Example)

22.42 Grams (100.00 mmol) of 2,3,5-tricarboxycyclopentylacetic acid dianhydride as a tetracarboxylic acid dianhydride and 10.81 g (100.00 mmol) of p-phenylenediamine as a diamine compound were dissolved in 299.07 g of N-methyl-2-pyrrolidone, and the mixture was allowed to react at 60° C. for 6 hours.

Then, the reaction mixture was poured into a large excess of methanol to precipitate a reaction product. Then, the reaction product was washed with methanol and dried under reduced pressure at 40° C. for 15 hours to give a specific polymer Iα having an inherent viscosity of 1.25 dl/g.

Synthesis Example 14 (Comparative Synthesis Example)

33.23 Grams of the specific polymer Iα obtained in Synthesis Example 13 was dissolved in 631.37 g of N-methyl-2-pyrrolidone, and 15.82 g of pyridine and 20.42 g of acetic anhydride were added. The mixture was subjected to an imidation reaction at 115° C. for 4 hours.

A reaction product was precipitated in the same manner as in Synthesis Example 1 to give a specific polymer Iα having an inherent viscosity of 1.25 dl/g.

Synthesis Example 15 (Comparative Synthesis Example)

21.81 Grams (100.00 mmol) of pyromellitic acid dianhydride as a tetracarboxylic acid dianhydride and 10.81 g (100.00 mmol) of p-phenylenediamine as a diamine compound were dissolved in 293.58 g of N-methyl-2-pyrrolidone, and the mixture was allowed to react at 60° C. for 6 hours.

Then, the reaction mixture was poured into a large excess of methanol to precipitate a reaction product. Then, the reaction product was washed with methanol and dried under reduced pressure at 40° C. for 15 hours to give a specific polymer Iβ having an inherent viscosity of 1.40 dl/g.

Synthesis Example 16 (Comparative Synthesis Example)

21.81 Grams (100.00 mmol) of pyromellitic acid dianhydride as a tetracarboxylic acid dianhydride and 5.4 g (50.00 mmol) of p-phenylenediamine and 16.2 g (50 mmol) of a diamine compound of the following formula (24) as diamine compounds were dissolved in 293.58 g of N-methyl-2-pyrrolidone, and the mixture was allowed to react at 60° C. for 6 hours. Then, the reaction mixture was poured into a large excess of methanol to precipitate a reaction product. Then, the reaction product was washed with methanol and dried under reduced pressure at 40° C. for 15 hours to give a specific polymer Iγ having an inherent viscosity of 1.20 dl/g.

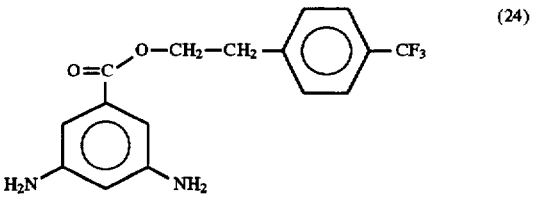

(24)

Synthesis Example 17 (Comparative Synthesis Example)

21.81 Grams (100.00 mmol) of pyromellitic acid dianhydride as a tetracarboxylic acid dianhydride and 5.4 g (50.00 mmol) of p-phenylenediamine and 14.76 g (50 mmol) of a diamine compound of the formula (21) as diamine compounds were dissolved in 293.58 g of N-methyl-2-pyrrolidone, and the mixture was allowed to react at 60° C. for 6 hours. Then, the reaction mixture was poured into a large excess of methanol to precipitate a reaction product. Then, the reaction product was washed with methanol and dried under reduced pressure at 400° C. for 15 hours to give a specific polymer Iδ having an inherent viscosity of 1.60 dl/g.

EXAMPLE 1

The polymer IIa obtained in Synthesis Example 2 was dissolved in γ-butyrolactone to form a solution having a solid content of 4 % by weight. The solution was filtered through a filter with pores having an opening diameter of 1 μm to prepare a liquid crystal aligning agent.

The above liquid crystal aligning agent was applied to the transparent electrode surface of a glass substrate provided with a transparent electrode of an ITO film with a spinner such that a film having a thickness of 800 angstroms was to be formed, and the applied solution coating the transparent electrode surface was calcined at 180° C. for 1 hour to form a film.

The film was rubbing-treated twice with a rubbing machine having a roll wrapped with a cloth of nylon at a pile impression of 0.6 mm at a roll rotation rate of 500 rpm at a stage speed of 1 cm/second. In this case, the adhesion of the aligning film to the substrate was excellent, and no peeling due to rubbing was found.

Then, an epoxy resin adhesive containing aluminum oxide particles having a diameter of 17 μm was applied to the marginal portions of the liquid crystal aligning film of a pair of substrates, which were rubbing-treated as above, by a screen printing method, and a pair of the substrates were placed one on the other such that the liquid crystal aligning film surfaces met and that the rubbing directions were in counter directions, and attached to each other under pressure. The adhesive was cured.

Then, a nematic liquid crystal (MLC-2001, supplied by Merck Ltd.) was charged into a space between a pair of the substrates through a liquid crystal inlet, and the liquid crystal inlet was sealed with an epoxy-containing adhesive. Polarization plates were attached to the outer surfaces of the substrates such that the polarization directions of the polarization plates were in the rubbing directions of the substrates, to produce a liquid crystal display device.

The so-obtained liquid crystal display device had excellent alignment characteristics, and when the device was measured for a pre-tilt angle to show 3.5°. Table 1 shows the results.

EXAMPLES 2–28

Liquid crystal display devices were prepared in the same manner as in Example 1 except that the specific polymer IIa was replaced with the specific polymer IIb, IIc, Id, Ie, If or IIg obtained in Synthesis Example 4, 6, 7, 8, 9 or 11, that the temperature for heating an aligning film was changed to 180°–250° C., that the film thickness was changed to 200–1,500 angstroms and that the frequency of rubbing was changed to 1–5 times. The so-obtained liquid crystal splay devices were measured for aligning characteristics pre-tilt angles, and Tables 1 and 2 show the results.

TABLE 1

| Ex. | Specific polymer | Heating temperature (°C.) | Film thickness (Å) | Frequency of rubbing | Pre-tilt angle (°) | Aligning characteristics |
|---|---|---|---|---|---|---|
| 1 | IIa | 180 | 800 | 2 | 3.5 | Excellent |
| 2 | IIa | 180 | 500 | 2 | 3.5 | Excellent |
| 3 | IIa | 180 | 300 | 2 | 3.4 | Excellent |
| 4 | IIa | 180 | 800 | 5 | 3.4 | Excellent |
| 5 | IIb | 180 | 800 | 2 | 8.2 | Excellent |
| 6 | IIb | 180 | 500 | 2 | 8.1 | Excellent |
| 7 | IIb | 180 | 300 | 2 | 8.1 | Excellent |
| 8 | IIb | 180 | 800 | 5 | 8.2 | Excellent |
| 9 | IIc | 180 | 800 | 2 | 89 | Excellent |
| 10 | IIc | 180 | 500 | 2 | 89 | Excellent |
| 11 | IIc | 180 | 300 | 2 | 89 | Excellent |
| 12 | IIc | 180 | 800 | 5 | 89 | Excellent |
| 13 | Id | 250 | 800 | 2 | 9.2 | Excellent |
| 14 | Id | 250 | 500 | 2 | 9.2 | Excellent |
| 15 | Id | 250 | 300 | 2 | 9.1 | Excellent |

Ex. = Example

TABLE 2

| Ex. | Specific polymer | Heating temperature (°C.) | Film thickness (Å) | Frequency of rubbing | Pre-tilt angle (°) | Aligning characteristics |
|---|---|---|---|---|---|---|
| 16 | Id | 250 | 800 | 5 | 9.2 | Excellent |
| 17 | Ie | 250 | 800 | 2 | 9.1 | Excellent |
| 18 | Ie | 250 | 500 | 2 | 9.0 | Excellent |
| 19 | Ie | 250 | 300 | 2 | 9.0 | Excellent |
| 20 | Ie | 250 | 800 | 5 | 9.1 | Excellent |
| 21 | If | 250 | 800 | 2 | 8.8 | Excellent |
| 22 | If | 250 | 500 | 2 | 8.7 | Excellent |
| 23 | If | 250 | 300 | 2 | 8.7 | Excellent |
| 24 | If | 250 | 800 | 5 | 8.8 | Excellent |
| 25 | IIg | 250 | 800 | 2 | 5.2 | Excellent |
| 26 | IIg | 250 | 500 | 2 | 5.2 | Excellent |
| 27 | IIg | 250 | 300 | 2 | 5.1 | Excellent |
| 28 | IIg | 250 | 800 | 5 | 5.1 | Excellent |

Ex. = Example

EXAMPLES 29–33

Liquid crystal display devices were prepared in the same manner as in Example 1 except that the specific polymer IIa was replaced with the specific polymer IIh obtained in Synthesis Example 12, that the temperature for heating an aligning film was changed to 180°–250° C., that the thickness was changed to 200–1,500 angstroms and that the frequency of rubbing was changed to 1–5 times. The so-obtained liquid crystal display devices were measured for aligning characteristics and pre-tilt angles, and Table 3 shows the results.

TABLE 3

| Ex. | Specific polymer | Calcining temperature (°C.) | Film thickness (Å) | Frequency of rubbing | Pre-tilt angle (°) | Aligning characteristics |
|---|---|---|---|---|---|---|
| 29 | IIh | 180 | 800 | 2 | 4.0 | Excellent |
| 30 | IIh | 180 | 500 | 2 | 4.0 | Excellent |
| 31 | IIh | 180 | 300 | 2 | 3.9 | Excellent |
| 32 | IIh | 180 | 800 | 5 | 3.9 | Excellent |
| 33 | IIh | 250 | 800 | 2 | 4.1 | Excellent |

Ex. = Example

COMPARATIVE EXAMPLE 1–20

Liquid crystal display devices were prepared in the same manner as in Example 1 except that the specific polymer IIa was replaced with the specific polymers obtained in Synthesis Examples 13 to 16, that the temperature for heating an aligning film was changed to 180°–250° C., that the film thickness was changed to 200–1,500 angstroms and that the frequency of rubbing was changed to 1–5 times. The so-obtained liquid crystal display devices were measured for aligning characteristics and pre-tilt angles, and Table 4 shows the results.

TABLE 4

| CEx. | Specific polymer | Heating temperature (°C.) | Film thickness (Å) | Frequency of rubbing | Pre-tilt angle (°) | Aligning characteristics |
|---|---|---|---|---|---|---|
| 1 | IIα | 180 | 800 | 2 | 2.5 | Excellent |
| 2 | IIα | 180 | 500 | 2 | 2.0 | Excellent |
| 3 | IIα | 180 | 300 | 2 | 1.2 | Excellent |
| 4 | IIα | 180 | 800 | 5 | 1.3 | Excellent |
| 5 | Iβ | 250 | 800 | 2 | 2.6 | Excellent |
| 6 | Iβ | 250 | 500 | 2 | 2.0 | Excellent |
| 7 | Iβ | 250 | 300 | 2 | 1.0 | Excellent |
| 8 | Iβ | 250 | 800 | 5 | 0.9 | Excellent |
| 9 | Iγ | 250 | 800 | 2 | 5.2 | Excellent |
| 10 | Iγ | 250 | 500 | 2 | 0.3 | Excellent |
| 11 | Iγ | 250 | 300 | 2 | 3.0 | Excellent |
| 12 | Iγ | 250 | 800 | 5 | 0.7 | Excellent |
| 13 | Iγ | 220 | 800 | 2 | 4.1 | Excellent |
| 14 | Iγ | 180 | 800 | 2 | 1.7 | Excellent |
| 15 | Iδ | 250 | 800 | 2 | 3.0 | Excellent |
| 16 | Iδ | 250 | 500 | 2 | 2.2 | Excellent |
| 17 | Iδ | 250 | 300 | 2 | 1.0 | Excellent |
| 18 | Iδ | 250 | 800 | 5 | 0.5 | Excellent |
| 19 | Iδ | 220 | 800 | 2 | 3.1 | Excellent |
| 20 | Iδ | 180 | 800 | 2 | 1.0 | Excellent |

CEx. = Comparative Example

The liquid crystal aligning agent of the present invention gives a liquid crystal aligning film which can achieve the excellent alignment of a liquid crystal and a high pre-tilt angle regardless of process conditions such as a film thickness and rubbing conditions, and which is therefore suitable for use in a TN, STN or SH liquid crystal display device.

Further, a liquid crystal display device having the aligning film formed of the liquid crystal aligning agent of the present invention is excellent in the alignment characteristics and reliability of a liquid crystal and can be effectively used in various apparatus such as a desk top calculator, a wrist watch, a clock, a counter, a word processor, a personal computer and a liquid crystal TV set.

What is claimed is:

1. A polyamic acid derived by reacting a diamine compound of the formula (1),

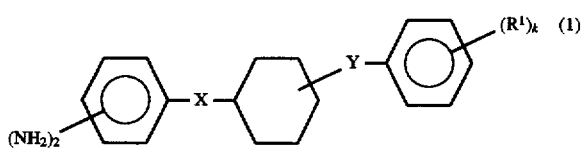

wherein $R^1$ is an alkyl group having 1 to 12 carbon atoms, a haloalkyl group having 1 to 12 carbon atoms or a halogen atom, each of X and Y is independently a divalent linking group of one of the following formulae (a) to (d),

(a)

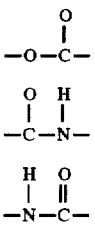

and k is an integer of 0 to 5, with a tetracarboxylic acid dianhydride.

2. A polyimide derived by dehydrating and ring-closing the polyamic acid recited in claim 1.

3. A liquid crystal aligning agent comprising the polyamic acid recited in claim 1 or the polyimide recited in claim 2.

4. The liquid crystal aligning agent of claim 3, wherein the tetracarboxylic acid dianhydride is at least one member selected from the group consisting of pyromellitic acid dianhydride, 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 5-(2,5-dioxotetrahydrofural)-3-methyl-3-cyclohexene-1,2-dicarboxylic acid dianhydride and bicyclo[2,2,2]-oct-7-ene-2,3,5,6-tetracarboxylic acid dianhydride.

5. The liquid crystal aligning agent of claim 3, wherein the diamine compound is a compound of the formula (1) in which $R^1$ is a trifluoromethyl group or a fluorine atom.

6. The liquid crystal aligning agent of claim 3, wherein the diamine compound is at least one compound selected from the group consisting of compounds of the following formulae (10) to (17):

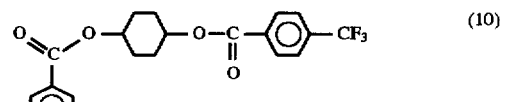
(10)

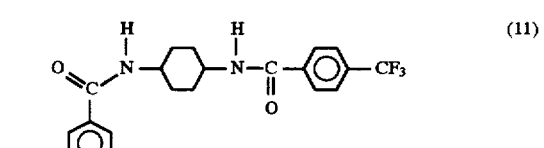
(11)

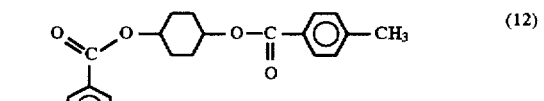
(12)

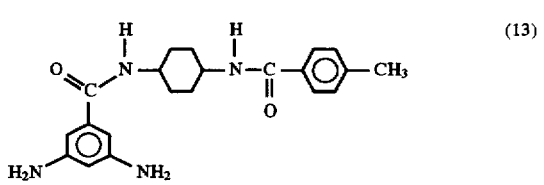
(13)

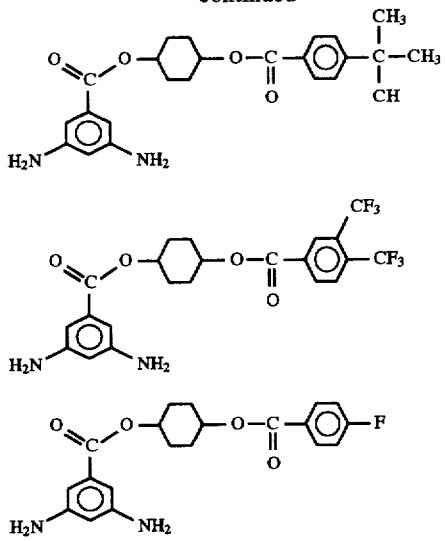

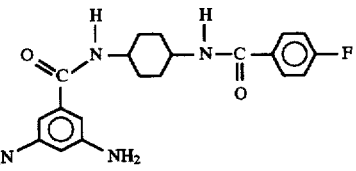

7. The liquid crystal aligning agent of claim 3, wherein the polyamic acid is a product obtainable by reacting the diamine compound of the formula (1) and at least one member selected from the group consisting of p-phenylenediamine, 4,4'-diaminodiphenylmethane, 1,5-diaminonaphthalene, bis(4-aminophenyl)-1,4-diisopropylbenzene, 4,4'-diaminodiphenyl ether and 4,4'-(p-phenyleneisopropylidene)bisaniline, with the tetracarboxylic acid dianhydride.

* * * * *